(12) United States Patent
Nishikawa

(10) Patent No.: US 7,916,313 B2
(45) Date of Patent: Mar. 29, 2011

(54) INFORMATION PROCESSING APPARATUS, CONTROL METHOD THEREOF, AND PROGRAM

(75) Inventor: Satoshi Nishikawa, Yokohama (JP)

(73) Assignee: Canon Kabushiki Kaisha (JP)

( * ) Notice: Subject to any disclaimer, the term of this patent is extended or adjusted under 35 U.S.C. 154(b) by 226 days.

(21) Appl. No.: 12/439,870

(22) PCT Filed: Oct. 30, 2007

(86) PCT No.: PCT/JP2007/071451
§ 371 (c)(1),
(2), (4) Date: Mar. 4, 2009

(87) PCT Pub. No.: WO2008/059720
PCT Pub. Date: May 22, 2008

(65) Prior Publication Data
US 2010/0302592 A1    Dec. 2, 2010

(30) Foreign Application Priority Data
Nov. 14, 2006 (JP) .................................. 2006-308408

(51) Int. Cl.
G06K 15/00 (2006.01)
G06F 3/12 (2006.01)
(52) U.S. Cl. ..................... 358/1.1; 358/1.6; 358/1.18
(58) Field of Classification Search ............... 358/1.15, 358/1.1, 1.6, 1.18, 300, 471
See application file for complete search history.

(56) References Cited

U.S. PATENT DOCUMENTS

| 2004/0145755 A1* | 7/2004 | Ishiguro | 358/1.1 |
| 2006/0192982 A1 | 8/2006 | Ogasawara | |
| 2007/0244916 A1* | 10/2007 | Dreyer et al. | 707/101 |
| 2008/0074685 A1* | 3/2008 | Sakamoto | 358/1.9 |

FOREIGN PATENT DOCUMENTS

| JP | 10-16344 A | 1/1998 |
| JP | 2005-260332 A | 9/2005 |
| JP | 2005-329588 A | 12/2005 |
| JP | 2006-43975 A | 2/2006 |
| JP | 2006-243816 A | 9/2006 |
| WO | WO2008/059720 | * 5/2008 |

OTHER PUBLICATIONS

International Search Report and Written Opinion of the International Searching Authority issued in corresponding PCT application No. PCT/JP2007/071451, dated Jan. 29, 2008.

* cited by examiner

Primary Examiner — Jerome Grant, II
(74) Attorney, Agent, or Firm — Rossi Kimms & McDowell LLP

(57) ABSTRACT

Document data is stored including both permanent pages whose page contents are permanent and variable pages whose page contents vary depending on a plurality of types of records. Print data which includes the variable pages and is to be output to the first printing apparatus serving as a plateless printing apparatus, and plate data which does not include the variable pages and is used to make a press plate used in the second printing apparatus serving as a plate printing apparatus are generated from the document data.

9 Claims, 32 Drawing Sheets

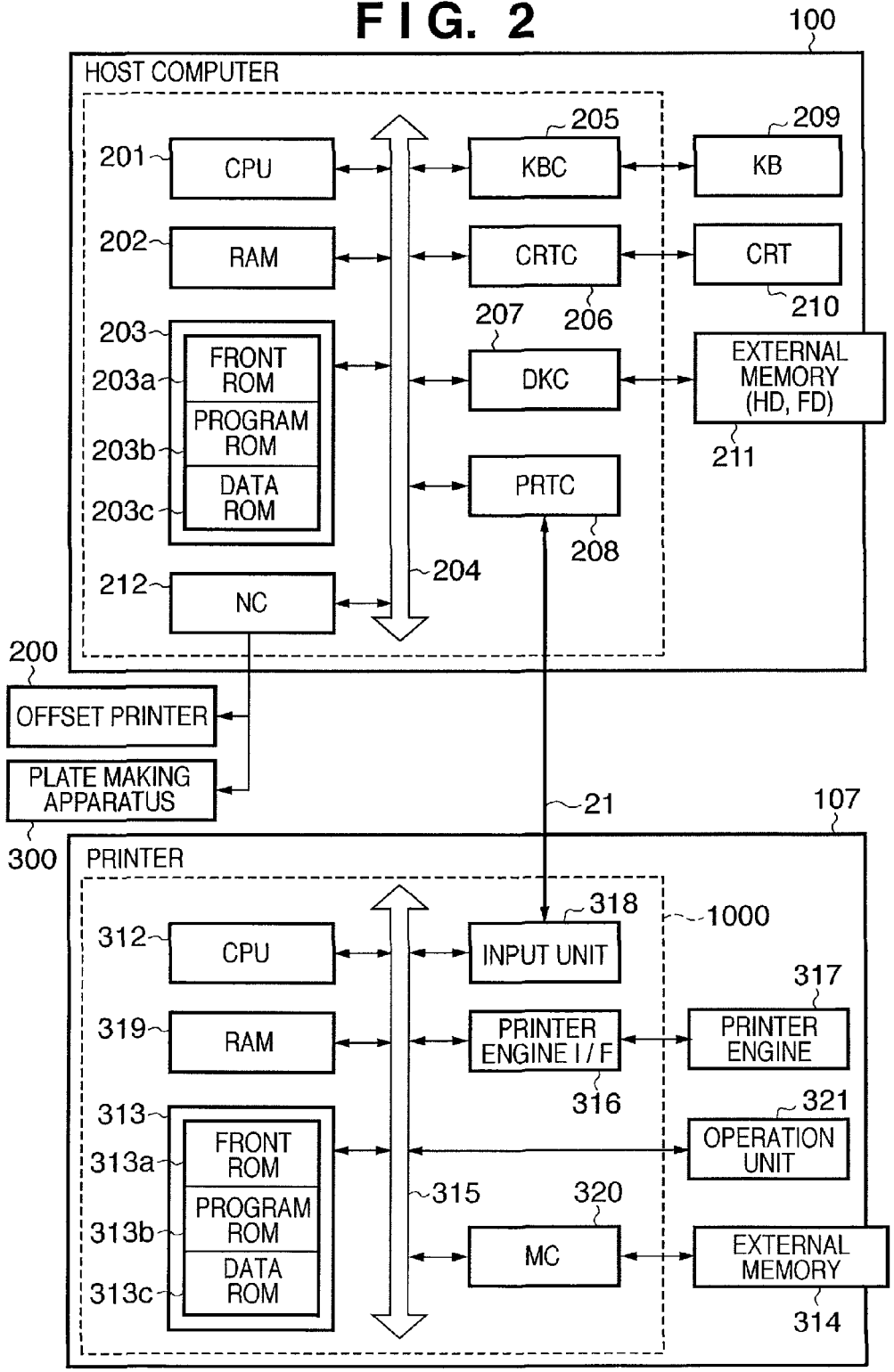

F I G. 3A
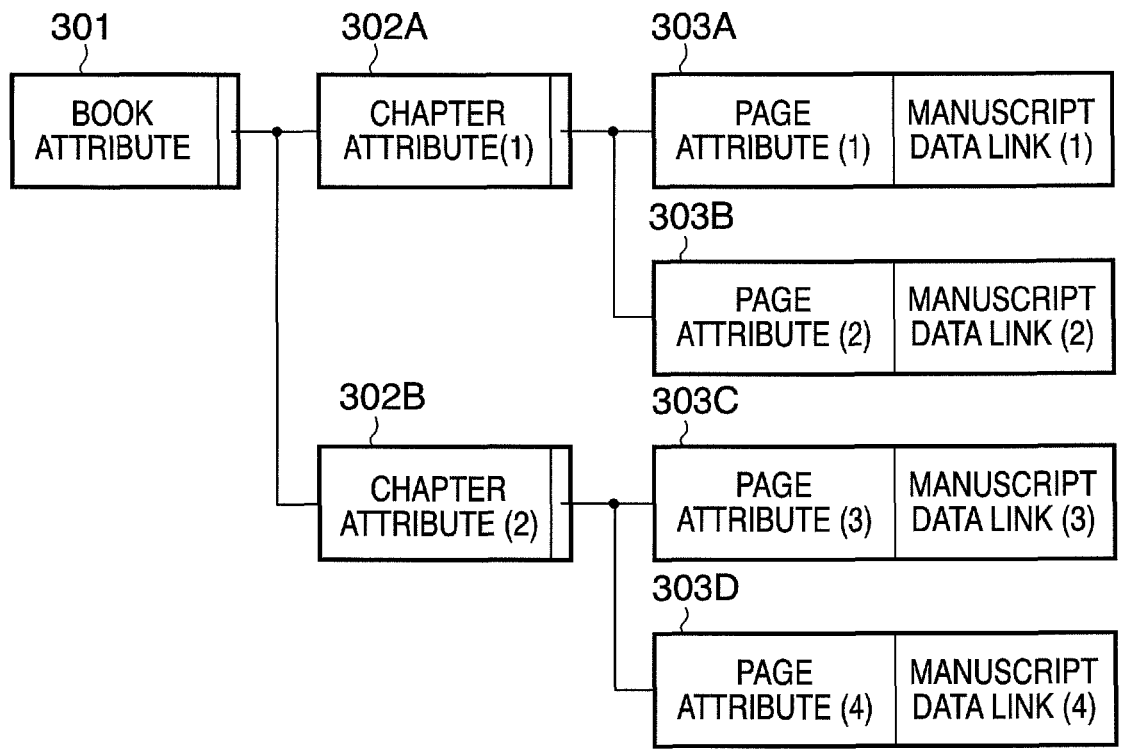
F I G. 3B
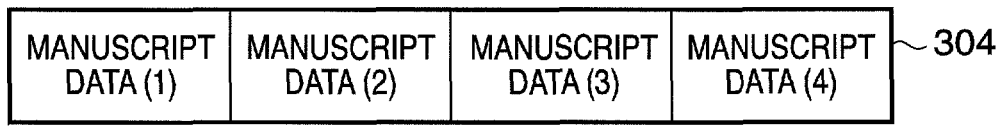

FIG. 4A

| NO | ATTRIBUTE INFORMATION | | REMARKS |
|---|---|---|---|
| 1 | PRINT METHOD | SINGLE-SIDED, DOUBLE-SIDED, AND BOOKLET PRINT | |
| 2 | SHEET SIZE | MANUSCRIPT SIZE OR FIXED SIZE | • Z-FOLD DESIGNATION IN CASE OF DESIGNATION OF "A4 + A3", "B4 + B3", AND "LETTER + LEDGER (11 × 17)"<br>• AUTOMATICALLY SELECT MANUSCRIPT SIZE OF FIRST CHAPTER / FIRST PAGE UPON DESIGNATION OF BOOKLET PRINT OR N-up PRINT |
| 3 | SHEET ORIENTATION | PORTRAIT AND LANDSCAPE | • SELECTABLE ONLY FOR FIXED SIZE |
| 4 | BINDING MARGIN / BINDING DIRECTION | | • ALLOW SHIFT AND ENLARGEMENT / REDUCTION DESIGNATION |
| 5 | N-up PRINT DESIGNATION | NUMBER OF PAGES, ALLOCATION ORDER, BOUNDARY LINE, ALLOCATION POSITION, ETC. | • NINE PATTERNS OF ALLOCATION POSITIONS<br>• ALLOW EQUAL-MAGNIFICATION PRINT DESIGNATION |
| 6 | ENLARGEMENT / REDUCTION | ON / OFF | AUTOMATIC ON DESIGNATION UPON SELECTION OF SHEET SIZE = FIXED SIZE OR N-up PRINT; ALLOW OFF DESIGNATION |
| 7 | WATERMARK | | • ALLOW INDEPENDENT DESIGNATION FOR RESPECTIVE LOGICAL PAGES AND RESPECTIVE PHYSICAL PAGES<br>• FOR ALL CHAPTERS / ALL PAGES |

FIG. 4B

| | | |
|---|---|---|
| 8 | HEADER / FOOTER | • ALLOW INDEPENDENT DESIGNATION FOR RESPECTIVE LOGICAL PAGES AND RESPECTIVE PHYSICAL PAGES<br>• FOR ALL CHAPTERS / ALL PAGES |
| 9 | DISCHARGE METHOD | STAPLING / PUNCH HOLE — • ALLOW STAPLING OR PUNCH HOLE DESIGNATION ONLY FOR SINGLE-SIDED / DOUBLE-SIDED PRINT<br>• 1 OR 2 STAPLING POSITIONS AVAILABLE |
| 10 | BOOKBINDING DETAILS | OPENING DIRECTION, SADDLE STITCHING, ENLARGEMENT / REDUCTION DESIGNATION, BINDING MARGIN, SEPARATE BINDING DESIGNATION, ETC. — • ONLY IN BOOKLET PRINT |
| 11 | FRONT COVER / BACK COVER | • PRINT DESIGNATION FOR FRONT COVER 1/2 AND BACK COVER 1/2<br>• PAPER FEED PORT (INCLUDING INSERTER) DESIGNATION |
| 12 | INDEX SHEET | • ALLOW TO SET CHARACTER STRING PRINT ON INDEX PART AND ANNOTATION ON INDEX SHEET<br>• NOT ALLOW TO DESIGNATE BOOKLET PRINT |
| 13 | INTERLEAF | • PAPER FEED PORT (INCLUDING INSERTER) DESIGNATION<br>• ALLOW TO PRINT MANUSCRIPT DATA ON INSERTED SHEET<br>• NOT ALLOW TO DESIGNATE BOOKLET PRINT |
| 14 | CHAPTER DIVISION | "NONE", "CHANGE FOR PAGE", AND "CHANGE FOR SHEET" — • FIX "CHANGE FOR SHEET" UPON DESIGNATION OF INDEX SHEET OR INTERLEAF<br>• "CHANGE FOR SHEET" IN SINGLE-SIDED PRINT |

FIG. 5

| NO | ATTRIBUTE INFORMATION | | REMARKS |
|---|---|---|---|
| 1 | SHEET SIZE | MANUSCRIPT SIZE OR FIXED SIZE | • AUTOMATICALLY DESIGNATE "CHANGE FOR SHEET" UPON SELECTION OF FIXED SIZE<br>• ALLOW TO CHANGE ONLY DESIGNATED SHEET UPON SELECTION OF PLURAL SHEETS IN BOOK;<br>ALLOW TO CHANGE SHEET SIZE IN DESIGNATION TO FIT TO BOOK |
| 2 | SHEET ORIENTATION | PORTRAIT OR LANDSCAPE | • ALLOW TO DESIGNATE ONLY FOR CASE OF FIXED SIZE |
| 3 | N-up PRINT DESIGNATION | NUMBER OF PAGES, ALLOCATION ORDER, BOUNDARY LINE, ALLOCATION POSITION, ETC. | • NINE PATTERNS OF ALLOCATION POSITIONS<br>• ALLOW EQUAL-MAGNIFICATION PRINT DESIGNATION |
| 4 | ENLARGEMENT / REDUCTION | ON / OFF | • AUTOMATIC ON DESIGNATION UPON SELECTION OF SHEET SIZE = FIXED SIZE OR N-up PRINT;<br>ALLOW OFF DESIGNATION |
| 5 | WATERMARK | DISPLAY / NON-DISPLAY | • DESIGNATE WHETHER OR NOT TO DISPLAY ALL WATERMARKS DESIGNATED IN BOOK |
| 6 | HEADER / FOOTER | DISPLAY / NON-DISPLAY | • DESIGNATE WHETHER OR NOT TO DISPLAY ALL HEADERS / FOOTERS DESIGNATED IN BOOK |
| 7 | DISCHARGE METHOD | STAPLING | • ALLOW TO DESIGNATE OFF IN CASE OF STAPLING DESIGNATION IN BOOK; DEFAULT = ON |

FIG. 6

| NO | ATTRIBUTE INFORMATION | | REMARKS |
|---|---|---|---|
| 1 | PAGE ROTATION DESIGNATION | | • ALLOW TO DESIGNATE 0, 90, 180, OR 270° |
| 2 | WATERMARK | DISPLAY / NON-DISPLAY | • DESIGNATE WHETHER OR NOT TO DISPLAY ALL WATERMARKS DESIGNATED IN BOOK |
| 3 | HEADER / FOOTER | DISPLAY / NON-DISPLAY | • DESIGNATE WHETHER OR NOT TO DISPLAY ALL HEADERS / FOOTERS DESIGNATED IN BOOK |
| 4 | ZOOM | 50%–200% | • DESIGNATE RELATIVE SCALE TO HAVE SIZE THAT FITS VIRTUAL LOGICAL PAGE REGION AS 100% |
| 5 | ALLOCATION POSITION | | • DESIGNATE FIXED NINE PATTERNS AND ARBITRARY POSITION |
| 6 | ANNOTATION | | |
| 7 | VARIABLE ITEM | | |
| 8 | PAGE DIVISION | | |

F I G. 16
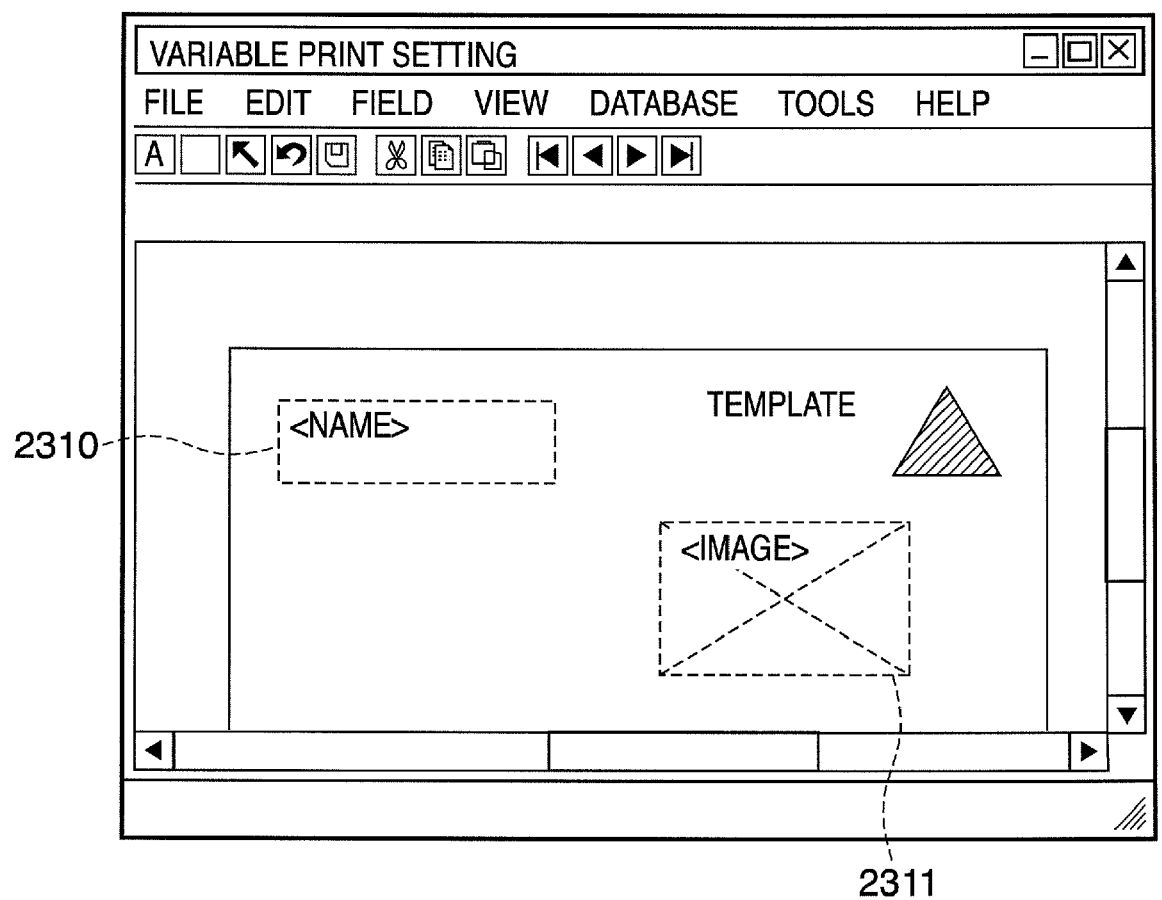

| PRINT | ? ✕ |

PRINTER NAME(N): [OFFSET PRESS A ▼]  [PROPERTIES(P)...]     ~1901

☐ SET PRINT STYLE COMPLIANT WITH PRINTER FUNCTION(E)

LIST OF UNAVAILABLE FUNCTIONS:
| COLOR PRINTING |

1902— [VARIABLE PAGE OUTPUT DESTINATION SETTING]

NUMBER OF COPIES(C): [1 ▲▼]   ☑ COLLATE(O)

☐ VARIABLE PRINT(V)
  ⦿ PRINT ALL RECORDS(R)
  ○ PRINT ONLY DESIGNATED RECORDS(S): [       ] RECORDS

PRINT RANGE(T): [DOCUMENT (ALL) ▼]

[OK]  [CANCEL]  [HELP(H)]
 1903    1904

FIG. 23

VARIABLE PAGE IMPOSITION SETTING — 2300

SHEET SETUP | PAGE SETUP

- OUTPUT SHEET SIZE(S): A3
- ORIENTATION OF OUTPUT SHEET(T): ○ PORTRAIT  ● LANDSCAPE
- FINISHING SIZE(F): A4   [USER DEFINITION(M)...]
- ORIENTATION OF FINISHING PAGE(O): ● PORTRAIT  ○ LANDSCAPE
- ☑ ENLARGE / REDUCE MANUSCRIPT TO FIT FINISHING SIZE

- IMPOSITION MODE(I): ● STANDARD  ○ SIMPLE
- IMPOSITION TYPE(L): 1×2    [NUMBER OF IMPOSITION(U)...]
- IMPOSITION METHOD(D): PAGE ORDER
- ☐ ADD PRINTER'S MARK(R):    [PRINTER'S MARK SETTING(K)...]

2301

- ☐ ENLARGE / REDUCE MANUSCRIPT TO FIT BLANK OF FINISHING PAGE(N):
- [BLANK OF FINISHING PAGE(G)...]
- [RESTORE LATEST STORAGE STATE(V)]

[OK]  [CANCEL]  [APPLY(A)]  [HELP]

2302   2303

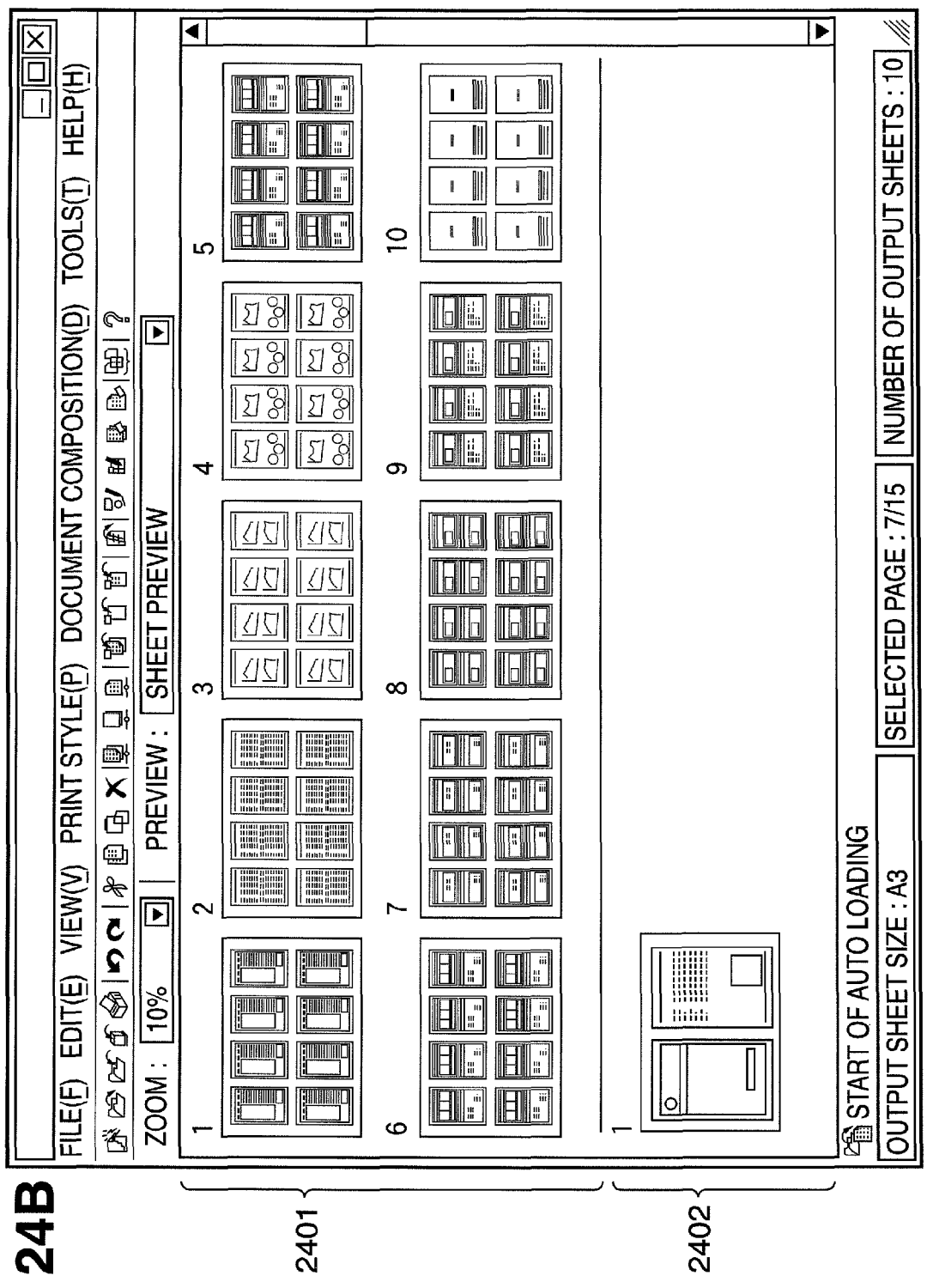

FIG. 26

WHOLE DOCUMENT SETTING — 2600

| SHEET SETUP | PAGE SETUP | FINISHING | EDIT | PAPER SOURCE | QUALITY |

OUTPUT SHEET SIZE(S): A1

ORIENTATION OF OUTPUT SHEET(T): ○ PORTRAIT ● LANDSCAPE

FINISHING SIZE(F): A4    USER DEFINITION(M)...

ORIENTATION OF FINISHING PAGE(O): ● PORTRAIT ○ LANDSCAPE

☑ ENLARGE / REDUCE MANUSCRIPT TO FIT FINISHING SIZE(Z):

IMPOSITION MODE(I): ● STANDARD ○ SIMPLE

IMPOSITION TYPE(L): 2×4    NUMBER OF IMPOSITION(U)...

IMPOSITION METHOD(D): AUTO

☑ ADD PRINTER'S MARK(R):    PRINTER'S MARK SETTING(K)...

2601

VARIABLE PAGE IMPOSITION SETTING

☐ ENLARGE / REDUCE MANUSCRIPT TO FIT BLANK OF FINISHING PAGE(N):

BLANK OF FINISHING PAGE(G)...

RESTORE LATEST STORAGE STATE(V)

OK | CANCEL | APPLY(A) | HELP 2603    2604

INFORMATION PROCESSING APPARATUS, CONTROL METHOD THEREOF, AND PROGRAM

This application is a U.S. National Phase Application of PCT International Application PCT/JP2007/071451 filed on Oct. 30, 2007.

TECHNICAL FIELD

The present invention relates to an information processing apparatus which executes an imposition process to lay out a plurality of finishing pages on a sheet and lay out manuscript data on each finishing page, a control method thereof, and a program.

BACKGROUND ART

There is a system formed from an information processing apparatus (e.g., personal computer) connected to a printer. Some systems of this type comprise a spool unit which temporarily saves data (so-called intermediate code) of a format different from that of print data to be finally transmitted to the printer before the information processing apparatus generates print data to be transmitted to the printer. This system comprises a despool unit which generates, from data temporarily saved in the intermediate code format, print data to be finally transmitted to the printer, and a generation unit which generates a printer control command.

This system supports so-called variable printing which is replacement printing of variable data. As the DTP (Desk Top Publishing) technique advances and digital printing apparatuses prevail, variable printing enables output of document data customized for each customer.

When creating a customized document, the variable printing system generally lays out a container in document data. The container is a rendering region also called a field region for rendering contents (rendering contents such as an image and text). The variable printing system lays out containers in document data, and associates the layout with a database (associates the containers with various contents in the database).

As a result, the variable printing system can create desired customized document data (called a document template). The contents of the document data can be changed (variable) by properly switching (changing the association) contents in the containers in the customized document data. This document data is called a variable data document, and a printing system using the variable data document is a variable printing system.

These days, demands for short delivery periods and work requests for various products in small lots are increasing in the market. To make a profit while meeting the user demands, printing companies are seeking for cooperation between offset printing and POD (digital printing).

The POD stands for Print On Demand. The POD can print many copies and many jobs within a short delivery period without using a large-scale printing apparatus or system. The POD implements digital printing using electronic data by fully utilizing a digital image forming apparatus such as a digital copying machine or digital multifunction peripheral.

In the POD market suitable for large-lot printing, demand has arisen for variable printing partially including variable data, like direct mail. Offset presses popular in the POD market are excellent in printing permanent contents in a large lot, but are not suited to variable printing of changing print contents for each product.

This is because the offset press generally uses seven color inks and requires plate making work to make a physical plate for each ink. This raises the plate fixed cost, labor cost, and time cost. To the contrary, an electrophotographic printer, which is a kind of digital image forming apparatus (digital press), forms an image using an electrostatic latent image. The electrophotographic printer does not require any physical plate, unlike offset printing, is free from the fixed cost, and can easily cope with small-lot printing and variable printing.

However, since the print sheet size of the digital press is smaller than that of the offset press, the unit cost per finishing print sheet is higher. At present, the digital press is suited to small-lot printing and variable printing, whereas the offset press is suited to large-lot printing.

Japanese Patent Laid-Open No. 2005-260332 discloses a function of detecting imposition information on the imposition position and electronically cutting large-size image data on the basis of the imposition information in order to use offset printing image data in on-demand printing. Also, Japanese Patent Laid-Open No. 2005-260332 discloses a function of editing each cut image based on information on a designated output form.

In many cases, the above-mentioned system is requested to provide printed materials of document data including permanent pages with permanent contents, and variable pages with variable data whose contents change for each printed material. The offset press cannot print such document data because it is disadvantageous to make a press plate for each variable printing (variable data printing). Thus, variable printing must be done by the digital press.

However, when document data including variable pages are printed in a large lot, the cost rises because of the above-described reasons. To prevent this, an operator at the POD center must classify permanent and variable pages in document data into separate document data. The offset press prints the document data of the permanent pages, and the digital press prints those of the variable pages.

However, it is troublesome to the operator to divide, into separate document data, document data in which variable and permanent pages coexist complicatedly.

DISCLOSURE OF INVENTION

The present invention has been made to overcome the conventional drawbacks, and has as its object to provide an information processing apparatus capable of dividing document data including both permanent and variable pages into document data including the variable pages and document data including no variable page, and easily generating output data of the permanent and variable pages without increasing the work load on the operator, a control method thereof, and a program.

It is another object of the present invention to provide an information processing apparatus capable of easily generating output data of permanent and variable pages at different sheet sizes by different imposition methods, a control method thereof, and a program.

According to the first aspect of the present invention, an information processing apparatus comprising:

storage means for storing document data including both a permanent page whose page content is permanent and a variable page whose page content varies depending on a plurality of types of records; and generation means for generating, from the document data, print data which includes the variable page and is to be output to a first printing apparatus serving as a plateless printing apparatus, and plate data which does not include the variable page and is used to make a press plate used in a second printing apparatus serving as a plate printing apparatus.

In a preferred embodiment, the generation means divides the document data into first document data including the variable page and second document data including no variable page, and generates, from the first document data, print data which includes the variable page and is to be output to the first printing apparatus serving as the plateless printing apparatus, and from the second document data, plate data which does not include the variable page and is used to make a press plate used in the second printing apparatus serving as the plate printing apparatus.

In a preferred embodiment, the apparatus further comprises determination means for determining whether the number of print sheets of the permanent page in the document data is not smaller than a set threshold value, wherein when the determination means determines that the number of print sheets is smaller than the threshold value, the generation means generates print data to be output to the first printing apparatus from the document data including both the variable page and the permanent page.

In a preferred embodiment, the apparatus further comprises threshold value setting means for setting the threshold value.

In a preferred embodiment, the apparatus further comprises:

first setting means for making a first imposition setting to impose the first document data on a print sheet;

second setting means for making a second imposition setting to impose the second document data on a press plate;

first imposition processing means for executing a first imposition process of the first document data in accordance with the first imposition setting; and second imposition processing means for executing a second imposition process of the second document data in accordance with the second imposition setting.

In a preferred embodiment, the apparatus further comprises display means for displaying imposition results by the first imposition processing means and the second imposition processing means.

In a preferred embodiment, the apparatus further comprises:

acquisition means for acquiring the number of records for a variable page in the document data and the number of permanent pages in the document data;

calculation means for calculating, on the basis of the second imposition setting, and the number of records and the number of permanent pages which are acquired by the acquisition means, the first number of output sheets of the first document data whose imposition method is page order, and the second number of output sheets of the second document data whose imposition method is page repeat; and auto imposition processing means for executing an imposition process for permanent pages in the document data by either of a page order imposition process and a page repeat imposition process on the basis of a calculation result of the calculation means.

According to the second aspect of the present invention, a method of controlling an information processing apparatus which processes document data including both a permanent page whose page content is permanent and a variable page whose page content varies depending on a plurality of types of records, the method comprising:

a generation step of generating, from the document data, print data which includes the variable page and is to be output to a first printing apparatus serving as a plateless printing apparatus, and plate data which does not include the variable page and is used to make a press plate used in a second printing apparatus serving as a plate printing apparatus; and an output step of outputting the print data generated in the generation step to the first printing apparatus, and the plate data generated in the generation step to a plate making apparatus.

According to the third aspect of the present invention, a program which is stored in a computer-readable medium and causes a computer to control an information processing apparatus which processes document data including both a permanent page whose page content is permanent and a variable page whose page content varies depending on a plurality of types of records, the program causing the computer to execute a generation step of generating, from the document data, print data which includes the variable page and is to be output to a first printing apparatus serving as a plateless printing apparatus, and plate data which does not include the variable page and is used to make a press plate used in a second printing apparatus serving as a plate printing apparatus, and an output step of outputting the print data generated in the generation step to the first printing apparatus, and the plate data generated in the generation step to a plate making apparatus.

Further features of the present invention will be apparent from the following description of exemplary embodiments with reference to the attached drawings.

BRIEF DESCRIPTION OF DRAWINGS

FIG. 2 is a block diagram showing the hardware arrangement of the document processing system according to the embodiment of the present invention;

FIGS. 3A and 3B are views schematically showing a data format of a book file according to the embodiment of the present invention;

FIGS. 4A and 4B are tables showing an example of book attributes according to the embodiment of the present invention;

FIG. 5 is a table showing an example of chapter attributes according to the embodiment of the present invention;

FIG. 6 is a table showing an example of page attributes according to the embodiment of the present invention;

FIG. 16 is a view for explaining an operation of the variable data printing editor according to the embodiment of the present invention;

FIG. 19 is a view showing an example of a print setting window according to the embodiment of the present invention;

FIG. 23 is a view showing an example of a variable page imposition setting window according to the embodiment of the present invention;

FIGS. 24A and 24B are views for explaining a sheet preview mode according to the embodiment of the present invention;

FIG. 26 is a view showing an example of a whole document setting window according to the embodiment shown in FIG. 25;

BEST MODE FOR CARRYING OUT THE INVENTION

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

In the following embodiments, plate printing using a press plate will be referred to as offset printing, and plateless printing using no press plate, typified by electrophotographic printing, will be referred to as digital printing. A manuscript page having variable data whose contents change for each printed material will be referred to as a variable page, and a manuscript page whose contents do not change will be referred to as a permanent page.

[Overview of Document Processing System]

In the document processing system according to an embodiment of the present invention, a data file created by a general application is converted into an electronic manuscript file by an electronic manuscript writer. A bookbinding application provides a function of editing the electronic manuscript file. This function can create and edit a document as a set of created data files, improve the operability, and efficiently edit the document.

Note that in this example, the functions of the general application, the electronic manuscript writer, the bookbinding application, an electronic manuscript despooler, and the like are separated to clarify various functions implemented by the document processing system. However, a package provided to the user is not limited to them. For example, these functions may be provided as an application or graphic engine which combines them.

<Example of Software Configuration of Document Processing System>

Figure 1:
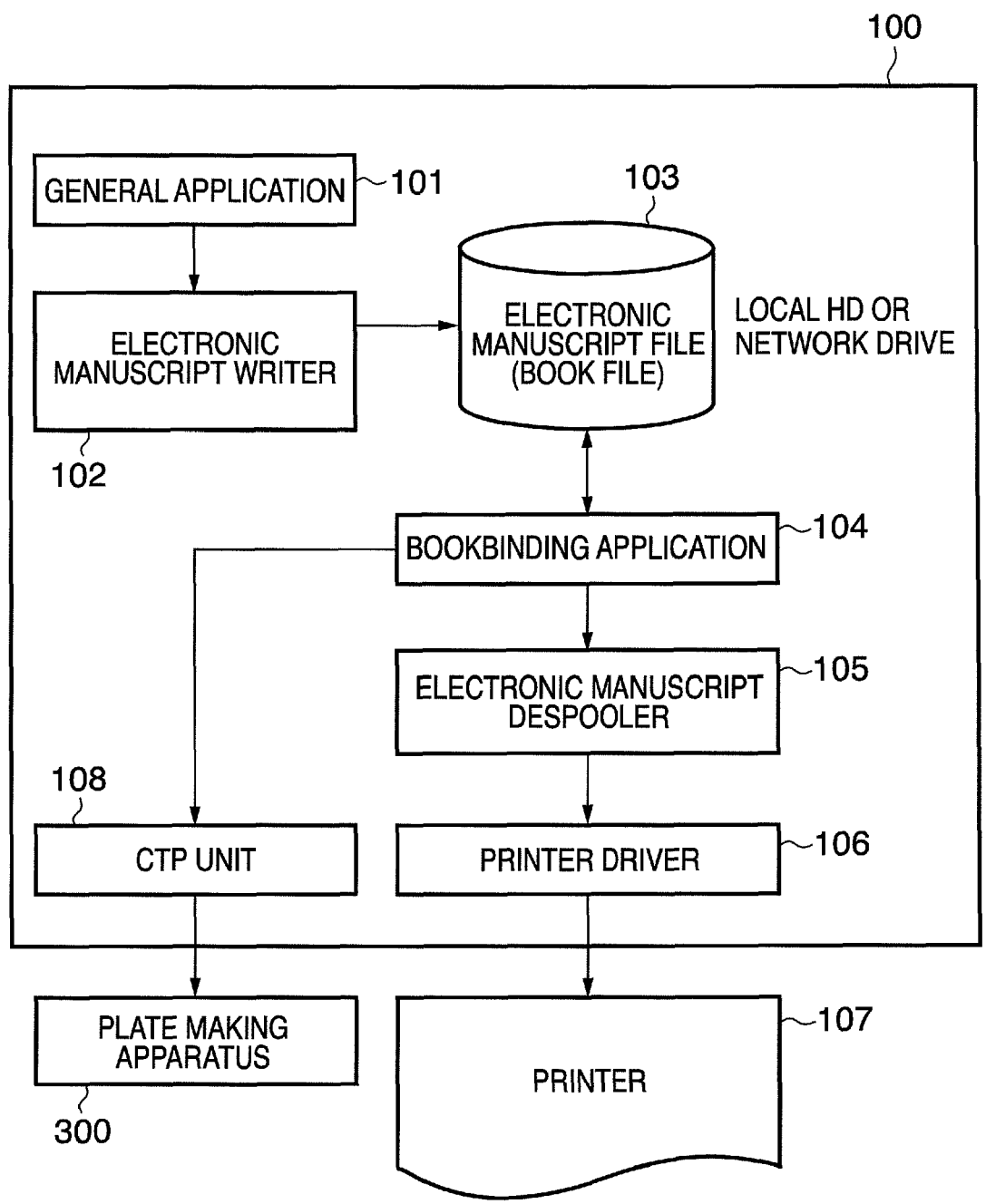
FIG. 1 is a block diagram showing the software configuration of a document processing system according to an embodiment of the present invention.

FIG. 1 is a block diagram showing the software configuration of the document processing system according to the embodiment of the present invention.

The document processing system is implemented by a computer 100 (to be also referred to as a host computer hereinafter) as a preferred embodiment of a document processing apparatus (information processing apparatus) of the present invention.

A general application 101 is an application program which provides various functions such as wordprocessing, spreadsheet, photo retouch, draw or paint, presentation, and text edit. The general application 101 has a print function for an OS (Operating System) which runs on the computer 100. The general application 101 uses a predetermined interface (called a GDI in general) which is provided by the OS when printing application data such as created document data and image data. The GDI stands for Graphic Device Interface.

That is, an arbitrary general application 101 sends output commands (called GDI functions) of a predetermined format depending on the OS to an output module (not shown) of the OS that provides a predetermined interface so as to print created data. Upon reception of the output commands, the output module converts the output commands into a format that can be processed by an output device such as a printer, and outputs the converted commands (called DDI: Device Driver Interface functions).

Since the format that can be processed by the output device differs depending on the types and vendors, models, and the like of devices, a device driver for controlling a device is provided for each device. The OS generates print data by converting the commands using the device driver, and bundles it with a JL (Job Language), thus generating a print job. When Microsoft Windows is used as the OS, a module called GDI (Graphic Device Interface) corresponds to the aforementioned output module.

An electronic manuscript writer 102 is a software module which is prepared by improving the aforementioned device driver, and is provided to implement the document processing system of the present invention. However, the electronic manuscript writer 102 does not intend to any specific output device, and converts the output commands into a format that can be processed by a bookbinding application 104 and printer driver 106 (to be described later).

The format after conversion by the electronic manuscript writer 102 (to be referred to as an "electronic manuscript format" hereinafter) is not particularly limited as long as it can express a manuscript for each page using a detailed form. Of practical standard formats, for example, a PDF format of Adobe Systems, U.S.A., an SVG (Scalable Vector Graphics) format published by W3C, U.S.A., and the like can be adopted as the electronic manuscript format.

When the general application 101 uses the electronic manuscript writer 102, it designates the electronic manuscript writer 102 as a device driver used in output, and then executes printing. However, an electronic manuscript file itself generated by the electronic manuscript writer 102 does not have a perfect format as an electronic manuscript file.

For this reason, the bookbinding application 104 designates the electronic manuscript writer 102 as a device driver, and application data is converted into an electronic manuscript file under the control of the bookbinding application 104. The bookbinding application 104 completes a new, imperfect electronic manuscript file generated by the electronic manuscript writer 102 as an electronic manuscript file having a format to be described later.

In the following description, when this difference must be clearly identified, a file created by the electronic manuscript writer 102 will be referred to as an "electronic manuscript file", and an electronic manuscript file to which a structure is given by the bookbinding application 104 will be referred to as a "book file". Also, when these files need not be especially distinguished from each other, all of a document file, electronic manuscript file, and book file generated by the application will be referred to as a document file (or document data).

In this way, the general application 101 prints its application data by designating the electronic manuscript writer 102 as a device driver. As a result, the application data is converted into an electronic manuscript format which includes pages (to be referred to as "logical pages" or "manuscript pages" hereinafter) defined by the general application 101 as a unit. The application data in this electronic manuscript format is stored in a storage medium such as a hard disk as an electronic manuscript file 103.

Note that the hard disk may be a local drive of a computer which implements the document processing system of the embodiment, or may be a drive provided on a network when the system is connected to the network.

When the general application 101 itself has a capability of generating data in the electronic manuscript format, it need not execute printing by designating the electronic manuscript writer 102. In this case, the application data of the electronic manuscript format generated by the general application 101 itself can also be converted into an electronic manuscript file under the control of the bookbinding application 104.

The bookbinding application 104 suitable for control programs in the present invention provides, to the user, a function of loading the electronic manuscript file (or book file) 103 and allowing the user to edit the loaded file. The bookbinding application 104 provides not a function of editing the contents of each page, but a function of editing the structures of a chapter and book (to be described later) which are formed from pages as a minimum unit.

When printing the book file 103 edited by the bookbinding application 104, the bookbinding application 104 launches an electronic manuscript despooler 105. The electronic manuscript despooler 105 is a program module installed in the computer together with the bookbinding application 104. The electronic manuscript despooler 105 is a module used to output rendering data to the printer driver 106 when printing a document (book file) used by the bookbinding application 104.

The electronic manuscript despooler 105 reads out the designated book file 103 from the hard disk, generates output commands suited to the output module of the OS so as to print respective pages in a format described in the book file 103, and outputs the generated commands to the output module. In this case, the electronic manuscript despooler 105 designates, as a device driver, the printer driver 106 of a printer 107 used as the output device.

The output module converts the received output commands into device commands, and outputs the device commands to the printer driver 106 of the printer 107. The printer driver 106 converts the device commands into printer commands of a page description language or the like that can be interpreted by the printer 107. The printer driver 106 sends the converted printer commands to the printer 107 via a system spooler (not shown). The printer 107 prints images corresponding to the printer commands on print sheets.

A CTP (Computer to Plate) unit 108 controls a plate making machine to input digital print information and make a press plate used in an offset press. The bookbinding application 104 also has a function of generating press plate data for making a press plate used in the offset press, like the PDF (Portable Document Format) or TIFF format. The bookbinding application 104 may save generated press plate data as a file in a designated directory, or directly output press plate data to the CTP unit 108.

In the embodiment, a characteristic control program is called the bookbinding application 104, but need not have a booklet print function. The control program according to the present invention suffices to be able to output print data via the printer driver 106 and output press plate data to the CTP unit 108.

<Example of Hardware Arrangement of Document Processing System>

FIG. 2 is a block diagram showing the hardware arrangement of the document processing system according to the embodiment of the present invention.

Referring to FIG. 2, reference numeral 100 denotes a host computer which comprises a CPU 201. The CPU 201 executes processes based on programs such as a document processing program (application program) and print process related program stored in a program ROM 203b of a ROM 203 or an external memory 211. These processes include a document process that includes any combinations of components such as graphics data, image data, text data, and table data (including a spreadsheet). Furthermore, the CPU 201 systematically controls respective devices connected to a system bus 204 in the host computer 100.

The document processing program includes the above-described general application 101 and bookbinding application 104. The CPU 201 can execute these applications, and executes processes shown in flowcharts to be described later.

The program ROM 203b of the ROM 203 or the external memory 211 also stores programs such as a BIOS, and an operating system program (to be referred to as an OS hereinafter) serving as a control program of the CPU 201. A font ROM 203a of the ROM 203 or the external memory 211 stores data such as font data used in the document process. A data ROM 203c of the ROM 203 or the external memory 211 stores various data used to execute various processes such as the document process.

Reference numeral 202 denotes a RAM which serves as a main memory, work area, and the like of the CPU 201. Reference numeral 205 denotes a keyboard controller (KBC) which controls key inputs from a keyboard (KB) 209 and command inputs from a pointing device (not shown). Reference numeral 206 denotes a CRT controller (CRTC) which controls display on a CRT display (CRT) 210. Note that an LCD controller and LCD may be used in place of the CRT controller 206 and CRT display 210.

Reference numeral 207 denotes a disk controller (DKC) which controls access to the external memory 211 such as a hard disk (HD) or floppy® disk (FD). The external memory 211 stores various data such as a boot program, various applications, font data, user files, edit files, and a print control command generation program (to be referred to as a printer driver hereinafter).

Reference numeral 208 denotes a printer controller (PRTC) which is connected to the printer 107 via a predetermined two-way interface (interface) 21, and executes a communication control process with the printer 107. Examples of the two-way interface include a USB interface, IEEE1394 interface, and wireless LAN interface. Reference numeral 212 denotes a network controller (NC) which executes a communication control process with another device connected to a network.

Particularly in the embodiment, the host computer 100 is connected via the network controller 212 to a printer for offset printing (offset printer 200) and a plate making apparatus 300 which are connected to the network. The host computer 100 controls the plate making apparatus 300 to make a press plate (copper plate) used in the offset press by transmitting a press plate making job generated by the CTP unit 108 to the plate making apparatus 300. Offset printing can be executed for a designated number of sheets by setting the prepared press plate on the offset printer 200.

The offset printer 200 serving as an offset press can print on a print sheet by a known technique by setting the press plate made by the plate making apparatus 300. More specifically, the surface of the press plate made by the plate making apparatus 300 is processed to attain hydrophilic and hydrophobic portions. When water is poured over the entire press plate, the hydrophilic portion absorbs water, and the hydrophobic portion repels water. Then, ink is applied to the press plate. The ink is repelled at the water-absorbing portion and comes off, but remains at only the water-free portion. The ink on the press plate is transferred once on a blanket called a blanket component. Printing is done by transferring the ink onto paper serving as a print medium. This print method is called offset printing.

The CTP unit 108 receives plate data of the PDF or TIFF format generated by the bookbinding application 104. The CTP unit 108 executes RIP (Raster Image Process) of the press plate data for each color, and outputs the RIP data to the plate making apparatus.

The printer 107 is a printer for digital printing, unlike the offset printer 200 for offset printing. The printer for digital printing is suitable for variable data printing because it prints without making any press plate, unlike the offset press. In this specification, the printer for digital printing will be called a plateless printing apparatus.

The CPU 201 executes a rasterize process of outline font data onto a display information RAM assured on, for example, the RAM 202, thus allowing WYSIWYG on the CRT 210. Also, the CPU 201 opens various registered windows based on commands designated by a mouse cursor (not shown) or the like on the CRT 210, and executes a variety of data processes. When printing, the user opens a window (operation window) pertaining to print settings, and can make settings of a print method for the printer driver including printer settings and print mode selection.

In the printer 107, reference numeral 312 denotes a printer CPU. The printer CPU 312 systematically controls respective devices connected to a system bus 315 in a printer controller 1000. The printer CPU 312 outputs an image signal as output information to a printer engine 317 via a printer engine interface (I/F) 316. Note that this output is based on a program such as a control program stored in a program ROM 313b of a ROM 313 or an external memory 314.

The program ROM 313b of the ROM 313 stores programs such as the control program of the printer CPU 312. A font ROM 313a of the ROM 313 stores data such as font data used to generate the output information. When a printer does not comprise the external memory 314 such as a hard disk (HD) or IC card, a data ROM 313c of the ROM 313 stores information and the like used on the host computer 100.

The printer CPU 312 can communicate with the host computer 100 via an input unit 318, and notify the host computer 100 of various kinds of information such as status information in the printer 107. Reference numeral 319 denotes a RAM which serves as a main memory, work area, and the like of the printer CPU 312. The RAM 319 can expand its memory capacity by an optional RAM connected to an expansion port (not shown).

Note that the RAM 319 can also be used as an output information rasterization area, environmental data storage area, NVRAM, and the like. A memory controller (MC) 320 controls access to the external memory 314. The external memory 314 is connected as an option, and stores data such as font data, emulation programs, and form data. Reference numeral 321 denotes an operation unit having an operation panel, switches, LED indicators, and the like required to implement various operations for the printer 107.

The number of external memories 314 is not limited to one, and at least one external memory 314 may be connected. Also, a plurality of external memories including an optional font card in addition to built-in font data, and an external memory which stores a program for interpreting a printer control language of a different language system may also be connected. Further, the printer may comprise an NVRAM (not shown) to store printer mode setting information from the operation unit 321.

The printer 107 may be a printer having a stapling function as an extended function. The bookbinding application 104 of the host computer 100 implements printing using the stapling function (stapling control).

As long as this function of the printer 107 is implemented, the present invention is applicable to even a single device, a system formed from a plurality of devices, and a system which is connected via a network such as a LAN or WAN and performs processes.

<Example of Format of Electronic Manuscript Data>

Prior to a detailed description of the bookbinding application 104, the data format of a book file will be described.

The book file has a three-layered structure which simulates a book of paper media. An upper layer is called "book", simulates one book, and defines attributes associated with the whole document. An intermediate layer below the upper layer corresponds to chapters in a book, and is also called "chapter". As for each chapter, attributes for that chapter can be defined. A lower layer is "page", and corresponds to respective pages defined by the application program. For each page, attributes for that page can be defined. One book can include a plurality of chapters, each of which can include a plurality of pages.

FIGS. 3A and 3B are views schematically showing a data format of the book file according to the embodiment of the present invention.

In FIG. 3A, a book, chapters, and pages in the book file of this example are respectively indicated by corresponding nodes. One book file includes one book. The book and chapters include defined attribute values and links to lower layers as their entities since they are concepts for defining the structure as a book. Pages have, as entities, data for respective pages which are output by the application program. For this purpose, respective pages include entities of manuscript pages (manuscript page data or manuscript data) and links to respective manuscript page data.

Note that a print page to be output onto a print sheet such as a paper medium often includes a plurality of manuscript pages. This structure is not indicated by links but is indicated by attributes in the book, chapter, and page layers.

In FIG. 3A, a book 301 defines a book attribute, and is linked to two chapters 302A and 302B. These links exhibit that the book 301 contains the chapters 302A and 302B.

The chapter 302A is linked to pages 303A and 303B, which represents that the chapter 302A contains these pages. The pages 303A and 303B, attribute values of which are defined, contain links to manuscript page data (1) and (2) serving as the entities of the pages 303A and 303B. These links indicate data (1) and (2) of manuscript page data 304 as shown in FIG. 3B, and exhibit that the entities of the pages 303A and 303B are manuscript page data (1) and (2).

The chapter 302B is linked to pages 303C and 303D, which represents that the chapter 302B contains these pages. The pages 303C and 303D, attribute values of which are defined, contain links to manuscript page data (3) and (4) serving as the entities of the pages 303C and 303D. These links indicate data (3) and (4) of the manuscript page data 304 as shown in FIG. 3B, and exhibit that the entities of the pages 303C and 303D are manuscript page data (3) and (4).

FIGS. 4A and 4B are tables showing an example of book attributes according to the embodiment of the present invention.

Normally, as for items which can be defined to overlap those of lower layers, attribute values of lower layers are preferentially adopted. For this reason, as for items included in only the book attributes, the values defined in the book attributes are effective values throughout the book. However, as for items which overlap those of lower layers, these values mean specific values when they are not defined in lower layers. Note that each item shown in FIGS. 4A and 4B does not always correspond to one item in practice, but may often include a plurality of related items.

Items unique to the book attributes are seven items: a print method, binding margin/binding direction, bookbinding details, front/back cover, index sheet, interleaf, and chapter division. These items are defined throughout the book.

As print method attributes, three values, that is, single-sided printing, double-sided printing, and booklet printing can be designated. Booklet printing is to print in a format capable of bookbinding by bundling a designated number of sheets, folding the bundle into two, and stitching the bundle.

Of the binding margin/binding direction attributes, the direction to bind a document can be selected from long-side binding (left), long-side binding (right), short-side binding (top), and short-side binding (bottom) when the orientation of a sheet is portrait, and from long-side binding (top), long-side binding (bottom), short-side binding (left), and short-side binding (right) when the orientation of a sheet is landscape. The binding margin indicates the width of a margin region to be assigned to the binding direction side.

The bookbinding details attribute allows designating an opening direction, the number of sheets which form a bundle, binding margin (width), gutter shift, and the like when the imposition method such as "saddle stitching", "casing-in", or "quarto" is designated.

The front cover/back cover attribute includes designation of addition of a sheet used as a front cover and back cover, and designation of print contents on the added sheet when printing an electronic manuscript file bound as a book.

The index sheet attribute includes designation of insertion of index sheets with index parts, which are prepared separately in a printing apparatus as divisions of chapters, and designation of print contents on the index parts. This attribute becomes valid when the printing apparatus comprises an inserter which has an insert function of inserting sheets prepared independently of print sheets to desired positions, or when a plurality of paper cassettes are available. The same applies to an interleaf attribute.

The interleaf attribute includes designation of insertion of sheets to be supplied from an inserter or paper cassette as divisions of chapters, and designation of a paper source when inserting interleaves.

The chapter division attribute includes designation of use of a new sheet, use of a new print page, do-nothing, or the like at the divisions of chapters. In a single-sided print mode, use of a new sheet and that of a new print page have the same meaning. In a double-sided print mode, if "use of new sheet" is designated, successive chapters are never printed on one sheet. However, if "use of new print page" is designated, successive chapters may be printed on the obverse and reverse sides of one sheet.

FIG. 5 is a table showing an example of chapter attributes according to the embodiment of the present invention. FIG. 6 is a table showing an example of page attributes according to the embodiment of the present invention. The relationship between the chapter attributes and the page attributes is the same as that between the book attributes and the attributes of lower layers.

As for the chapter attributes, there are no items unique to chapters, and all items overlap those of the book attributes. Normally, if definitions in the chapter attributes are different from those in the book attributes, values defined in the chapter attributes are used preferentially.

Items common to only the book attributes and chapter attributes are five items: a sheet size, sheet orientation, N-up print designation, enlargement/reduction, and discharge method. Of these items, the sheet size indicates the size of a print sheet, as described above. The sheet size can be switched for each chapter when casing-in or folio bookbinding (corresponding to the above booklet printing) is not selected.

The sheet orientation indicates portrait or landscape.

The N-up print designation attribute is an item used to designate the number of manuscript pages included per print page. As layouts that can be designated, 1×1, 1×2, 2×2, 3×3, 4×4, and the like are available. If the enlargement/reduction attribute is ON, an input manuscript page can be enlarged or reduced to fit the output sheet size.

The discharge method attribute is an item used to designate whether or not to staple discharged sheets. The validity of this attribute depends on whether or not a printing apparatus used has a stapling function.

Items unique to the page attributes include page rotation designation, zoom, allocation position, annotation, and page division. The page rotation designation attribute is an item used to designate a rotation angle when allocating manuscript pages on a print page. The zoom attribute is an item used to designate a scale of manuscript pages. The scale is designated to have the size of a virtual logical page region as 100%. The virtual logical page region is a region occupied by one manuscript page when manuscript pages are allocated in accordance with N-up designation and the like. For example, in case of 1×1, the virtual logical page region corresponds to one print page. Also, in case of 1×2, the virtual logical page region corresponds to a region obtained by reducing each side of one print page to about 70%.

As attributes common to the book attributes, chapter attributes, and page attributes, a watermark attribute and header/footer attribute are available. A watermark is information of an image, character string, or the like, which is designated independently and is printed to be superposed on data created by the application. A header and footer are watermarks printed on a top margin and bottom margin of each page. Note that as the header and footer, items which are information of page numbers, dates and times, and the like, and can be designated as variables are prepared.

Note that the contents which can be designated in the watermark attribute and header/footer attribute are common in the chapter and page attributes but are different in the book attributes from those in the chapter and page attributes. In the book attributes, the contents of a watermark and header/footer can be designated. Also, how to print a watermark and header/footer throughout the book can be designated. On the other hand, in the chapter and page attributes, whether or not to print the watermark and header/footer designated in the book attributes in a chapter and page of interest can be designated.

<Example of Operation Sequence of Document Processing System>

(Example of Book File Generation Sequence)

The book file has the aforementioned structure and contents. A sequence to create a book file by the bookbinding application 104 and electronic manuscript writer 102 will be described below. Creation of a book file is implemented as a part of the book file edit operation.

Figure 7:
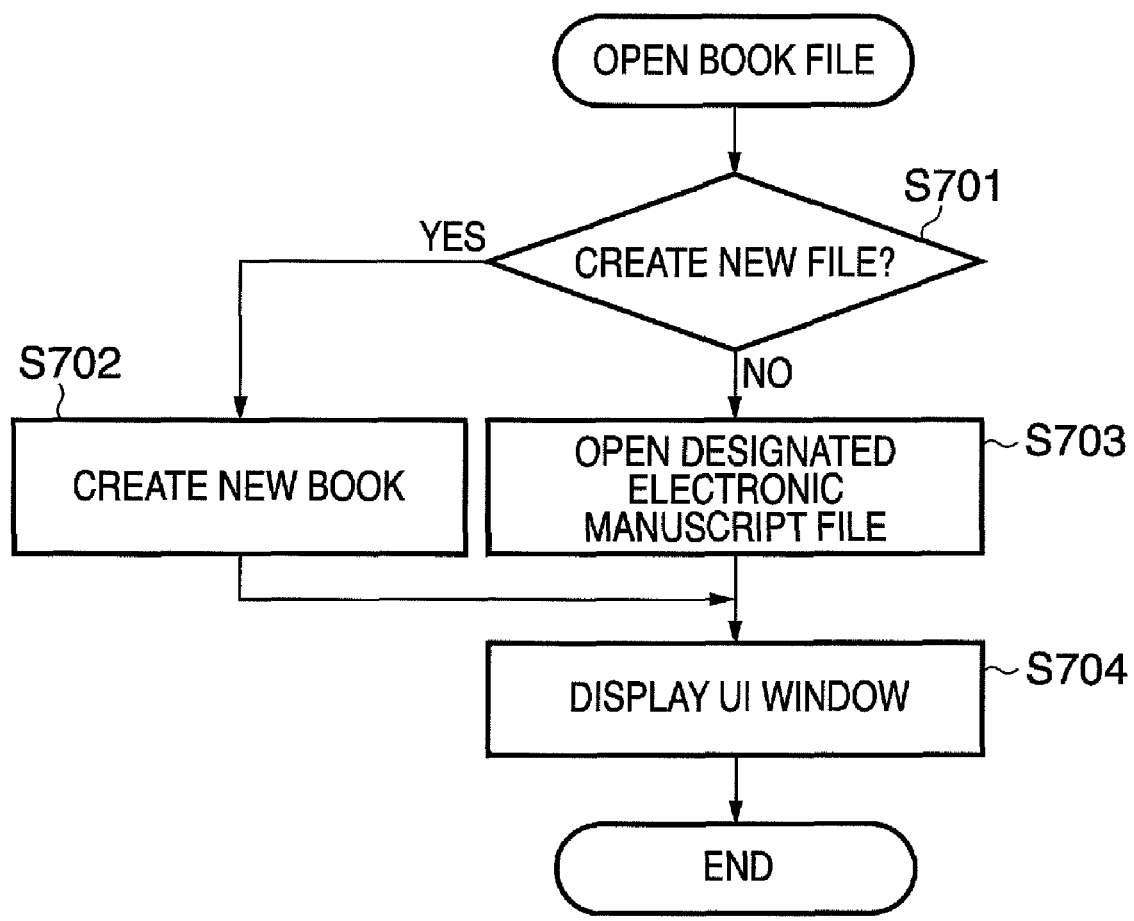
FIG. 7 is a flowchart showing a sequence to generate a book file by a bookbinding application according to the embodiment of the present invention.

FIG. 7 is a flowchart showing the sequence to generate a book file by the bookbinding application according to the embodiment of the present invention.

The bookbinding application 104 checks if a book file to be opened is a new file to be created or an existing file (step S701). In case of a new book file to be created (YES in step S701), the bookbinding application 104 crates a new book file including no chapter (step S702).

Figure 8:
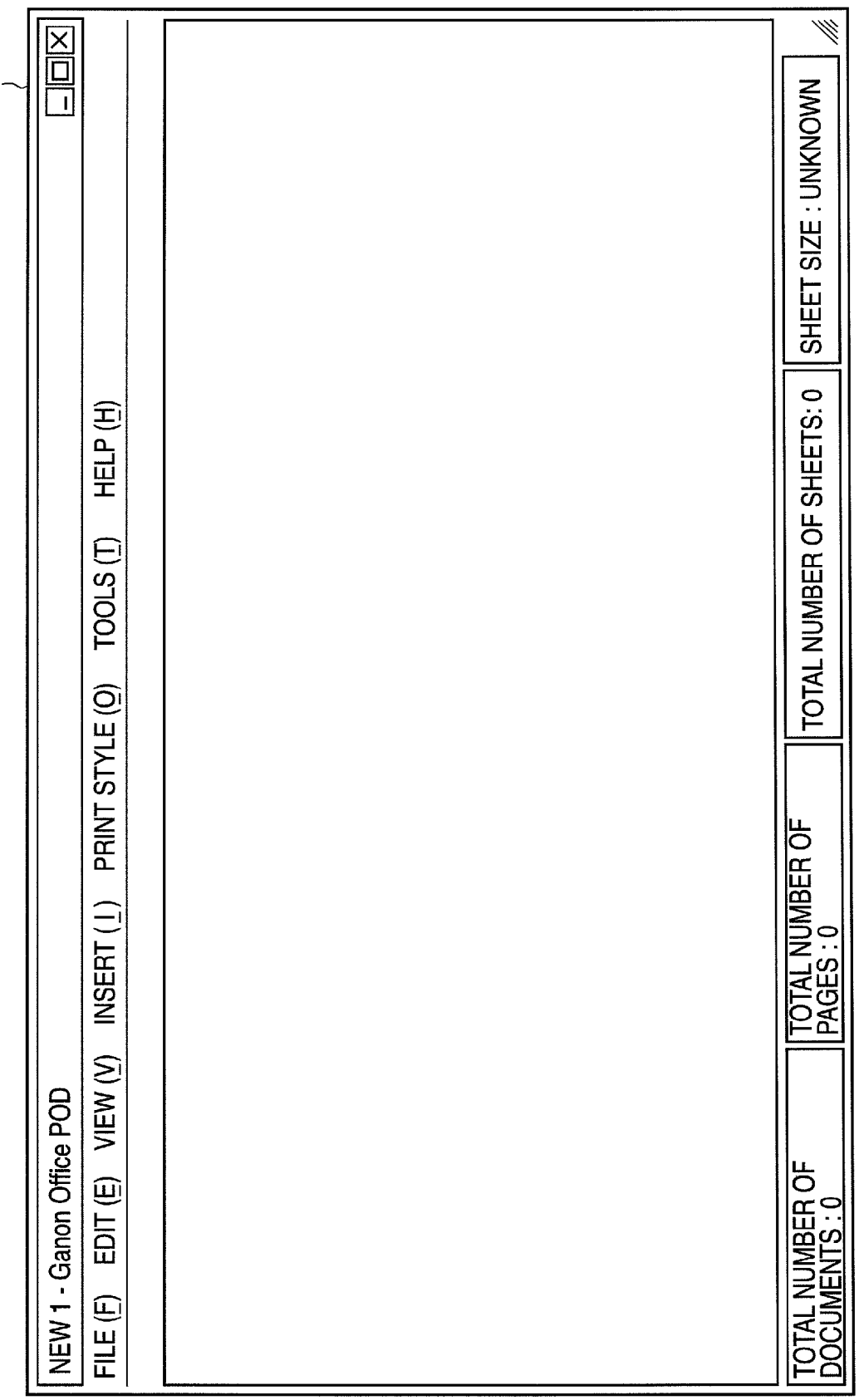
FIG. 8 is a view showing an example of a user interface window used upon creating a new book file according to the embodiment of the present invention.

In the example of FIG. 3A, the new book file to be created has only the book 301, and is a node of a book which has no links to nodes of chapters. As book attributes, a set of attributes prepared in advance for a new file to be created are applied. Then, the bookbinding application 104 displays a user interface (UI) window used to edit the new book file (step S704). FIG. 8 shows an example of a UI window 800 used upon creating a new book file. In this case, since the book file does not have any practical contents, nothing is displayed on the UI window 800.

Figure 9:
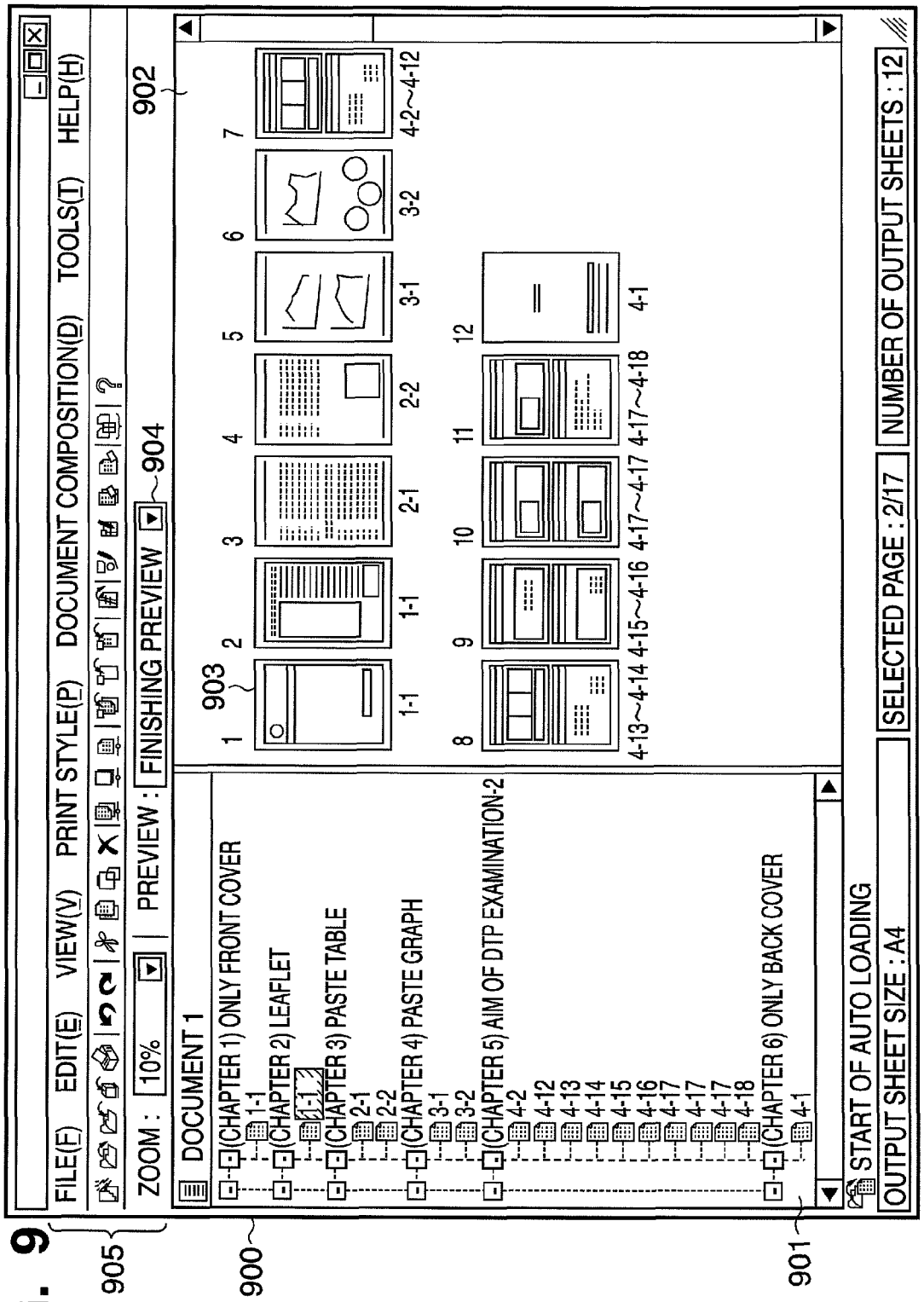
FIG. 9 is a view showing an example of a UI window by the bookbinding application according to the embodiment of the present invention.

On the other hand, if the book file to be opened is an existing book file (NO in step S701), the bookbinding application 104 opens the designated book file (step S703). The bookbinding application 104 displays a user interface (UI) window according to the structure, attributes, and contents of that book file. FIG. 9 shows an example of a UI window 900.

Details of the UI window 900 will be described below with reference to FIG. 9.

FIG. 9 is a view showing an example of the UI window by the bookbinding application according to the embodiment of the present invention.

The UI window 900 comprises a tree area 901 which indicates the structure of the book, and a preview area 902 which displays a printed state. The tree area 901 displays chapters included in the book, and pages included in the chapters to clarify the tree structure shown in FIG. 3A. Pages displayed in the tree area 901 are manuscript pages. The preview area 902 displays the contents of print pages (thumbnail images 903) in a reduced scale (thumbnail display). The display order reflects the structure of the book.

To the opened book file, application data which is converted into an electronic manuscript file by the electronic manuscript writer 102 can be added as a new chapter. This function will be referred to as an electronic manuscript import function hereinafter. By importing an electronic manuscript file to a new book file created in the sequence shown in FIG. 7, an entity can be given to that book file. This function is launched by dragging and dropping application data on the window shown in FIG. 8 or 9.

The processing sequence of this electronic manuscript import function will be described below with reference to FIG. 10.

Figure 10:
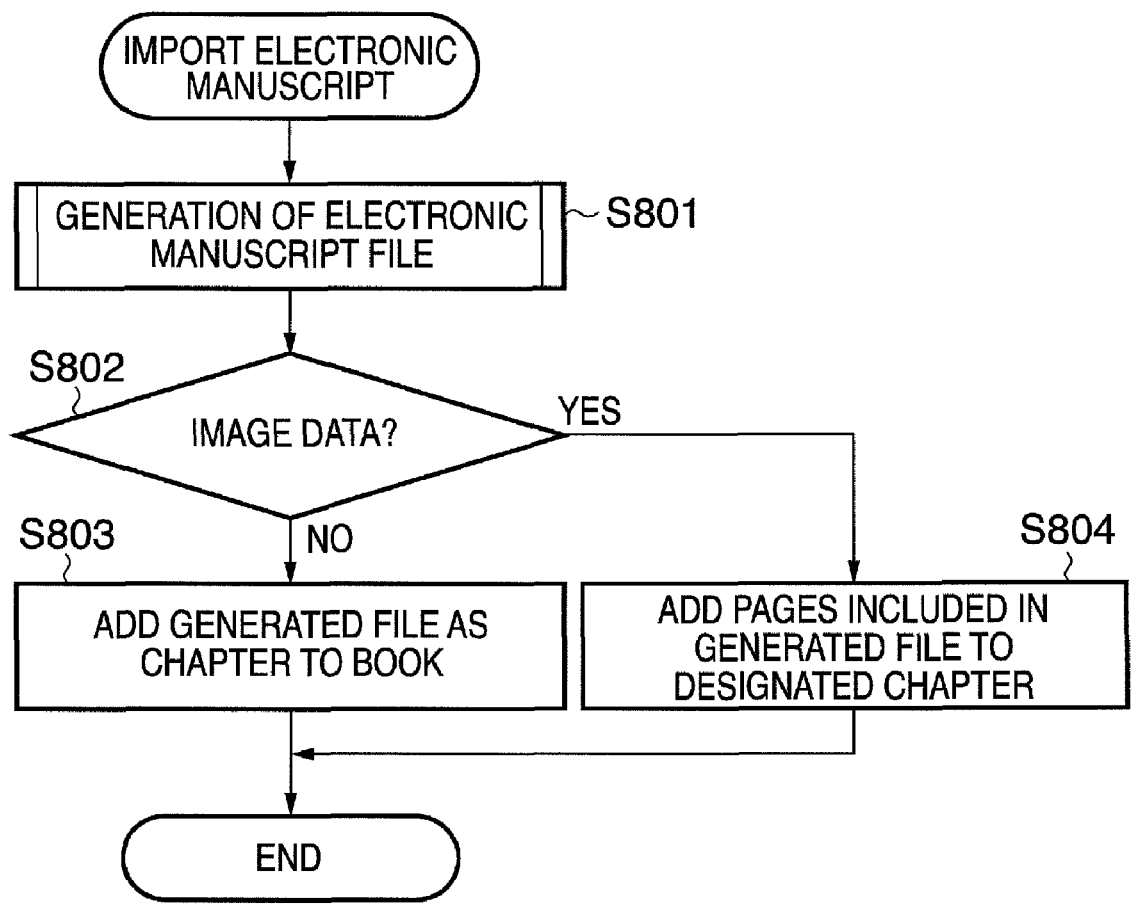
FIG. 10 is a flowchart showing a processing sequence to import an electronic manuscript according to the embodiment of the present invention.

FIG. 10 is a flowchart showing the processing sequence of the electronic manuscript import function according to the embodiment of the present invention.

An application program which generated the designated application data is launched, and the electronic manuscript writer 102 is designated as a device driver to print out the application data, thus converting the application data into electronic manuscript data (step S801).

Upon completion of conversion, it is checked if the converted electronic manuscript data is image data (step S802). This checking process can be attained based on the file extension of the application data if it is done under the Windows OS.

For example, if the extension is "bmp", the application data is determined as bitmap data; if the extension is "jpg", it is determined as JPEG image data; or if the extension is "tiff", it is determined as tiff image data. In case of such image data, since an electronic manuscript file can be directly generated from the image data without launching the application program, the process in step S801 can also be skipped.

If the converted data is not image data (NO in step S802), the generated electronic manuscript file is added as a new chapter to the book of the currently opened book file (step S803). Normally, as the chapter attributes, those common to the book attributes are set by copying the values of the book attributes, and the remaining attributes are set as specific values prepared in advance.

On the other hand, if the converted data is image data (YES in step S802), no new chapter is added as a general rule, and respective manuscript pages included in the generated electronic manuscript file are added to the designated chapter (step S804).

However, if the book file is a newly created file, a new chapter is created, and respective pages of the electronic manuscript file are added as those which belong to the new chapter. Normally, as the page attributes common to those of the upper layers, these attribute values are given, and as attributes of the electronic manuscript file which are inherited from those defined in the application data, these values are given.

For example, when N-up designation is designated in the application data, that attribute value is inherited. In this manner, a new book file is created, or a new chapter is added.

Details of step S801 will be described below with reference to FIG. 11.

Figure 11:
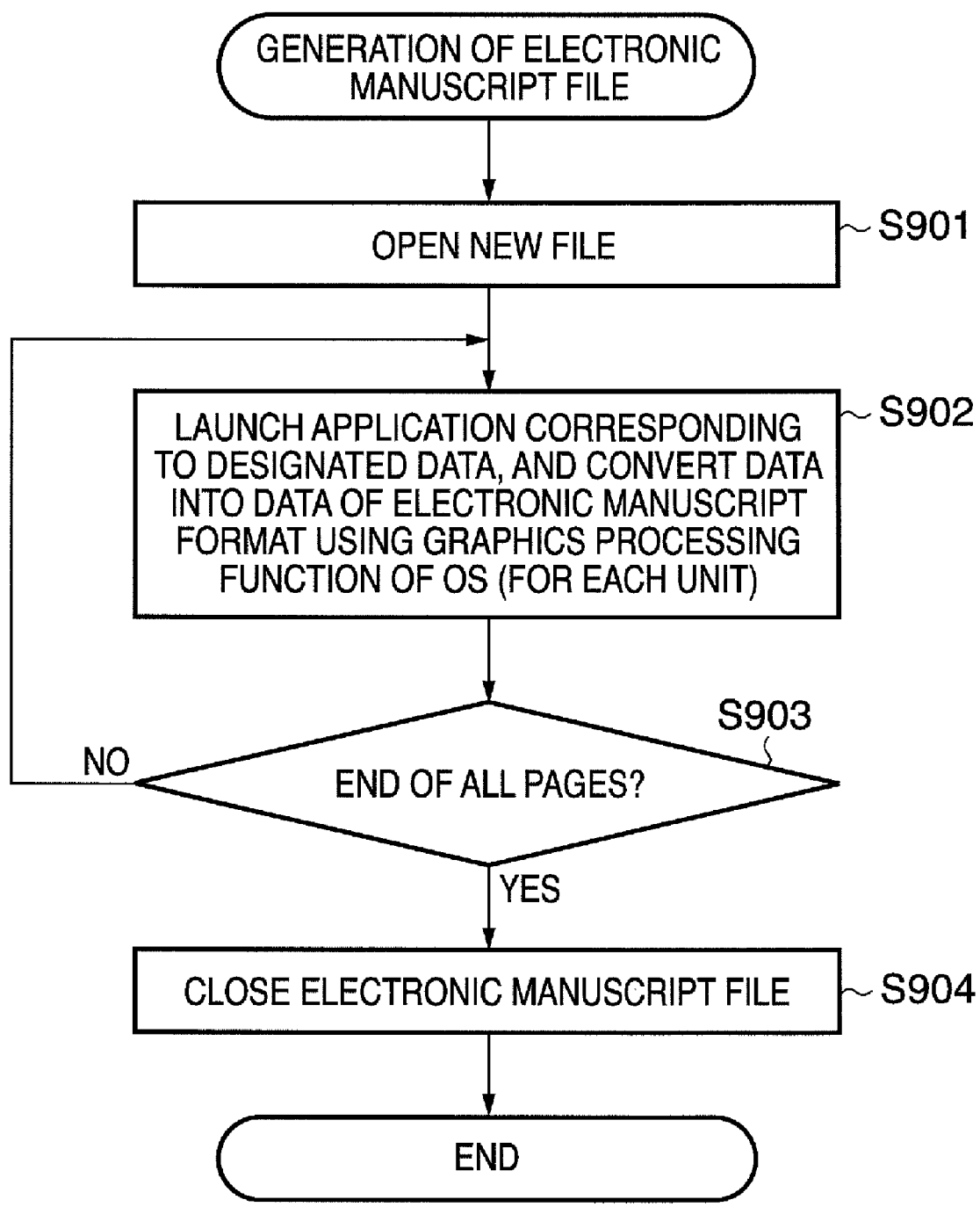
FIG. 11 is a flowchart showing details of the sequence to generate an electronic manuscript file in step S801 according to the embodiment of the present invention.

FIG. 11 is a flowchart showing details of the sequence to generate an electronic manuscript file in step S801 according to the embodiment of the present invention.

A new electronic manuscript file is created and opened (step S901). An application program corresponding to the designated application data is launched, and the electronic manuscript writer 102 is designated as a device driver to send output commands to the output module of the OS. The output module converts the received output commands into data in the electronic manuscript format by the electronic manuscript writer 102, and outputs the converted data (step S902). The output destination is the electronic manuscript file opened in step S901.

It is checked if all the designated data have been converted (step S903). If the data to be converted still remain (NO in step S903), the process returns to step S902. On the other hand, if all the designated data have been converted (YES in step S903), the electronic manuscript file is closed (step S904). The electronic manuscript file generated by the electronic manuscript writer 102 is a file which includes the entities of the manuscript page data shown in FIG. 3B.

(Edit Example of Book File)

In this way, the book file can be created from the application data. As for the generated book file, the following edit operations can be made for chapters band pages.

(1) New addition
(2) Delete
(3) Copy
(4) Cut
(5) Paste
(6) Move
(7) Change chapter name
(8) Re-assign page number name
(9) Insert cover
(10) Insert interleaf
(11) Insert index sheet
(12) Page layout for each manuscript page In addition, an operation to cancel the edit operation that was made once, and an operation to redo the canceled operation can be made. These edit functions allow edit operations such as integration of a plurality of book files, re-allocation of chapters and pages in a book file, deletion of chapters and pages in a book file, layout change of manuscript pages, and insertion of interleaves and index sheets.

Upon making these edit operations, the operation results are reflected in the attributes shown in FIGS. 4 to 6, or in the structure of the book file. For example, if a new addition operation of a blank page is made, a blank page is inserted at a designated position. This blank page is handled as a manuscript page. If the layouts of manuscript pages are changed, the change contents are reflected in the attributes of the print method, N-up print, front cover/spine/back cover, index sheet, interleaf, chapter division, and the like.

Display and operation examples upon editing in the embodiment will be described in detail later.

(Output Example of Book File)

The end goal of the book file which is created and edited as described above is to be printed out. When the user selects a file menu from the UI (user interface) window (operation window: FIG. 9) of the bookbinding application, and then selects "print" from that menu, the book file is printed out by the designated output device.

In this case, the bookbinding application 104 creates a job ticket from the currently opened book file, and passes it to the electronic manuscript despooler 105. The electronic manuscript despooler 105 converts the job ticket into output commands of the OS (e.g., GDI commands of Windows), and sends the converted commands to the output module (e.g., GDI). The output module generates commands suited to a device using the designated printer driver 106, and sends the commands to that device.

More specifically, a graphic engine of the output module loads the printer driver 106 prepared for each printing apparatus from the external memory 211 into the RAM 202, and sets the printer driver 106 as an output destination. The output module converts the received GDI (Graphic Device Interface) functions into DDI (Device Driver Interface) functions, and outputs the DDI functions to the printer driver 106.

The printer driver 106 converts, based on the DDI functions received from the output module, these functions into control commands (e.g., PDL (Page Description Language) commands) that can be interpreted by the printer. The converted printer control commands are output as print data to the printer 107 via a system spooler loaded into the RAM 202 by the OS and the interface 21.

Note that the job ticket is data which has a structure including a manuscript page as a minimum unit. The structure in the job ticket defines the layout of manuscript pages on each sheet. One job ticket is issued per job.

For this purpose, the structure includes an uppermost node named "document", which defines attributes of the whole document (e.g., attributes of double-sided printing/single-sided printing, and the like). To the document node, paper nodes belong, and include attributes such as identifiers of paper sheets to be used, and designation of a paper feed port in the printer.

To each paper node, a node of a sheet to be printed using that paper sheet belongs. One sheet corresponds to one paper sheet. To each sheet, a print page (physical page) belongs. In case of single-sided printing, one physical page belongs to one sheet. In case of double-sided printing, two physical pages belong to one sheet. To each physical page, manuscript pages to be allocated on that physical page belong. As attributes of physical pages, the layout of manuscript pages is included.

(Example of Preview Display Contents)

As has already been described above, when the book file is opened by the bookbinding application 104, the UI window 900 shown in FIG. 9 is displayed.

On the UI window 900, the tree area 901 displays a tree indicating the structure of the opened book (to be referred to as "book of interest" hereinafter). In the preview area 902, four display methods are prepared according to user designation.

The first display method is a manuscript preview mode called a manuscript view which directly displays manuscript pages. In the manuscript preview mode, the contents of manuscript pages which belong to the book of interest are displayed in the preview area 902 in a reduced scale. In this manuscript preview mode, the layouts are not reflected in the display of the preview area 902.

The second display method is a finishing preview mode. In the finishing preview mode, manuscript pages are displayed in the preview area 902 while reflecting their layouts (their finishing).

The third display method is a simple finishing preview mode. In the simple finishing preview mode, the contents of manuscript pages are not reflected in the display of the preview area 902, and only their layouts are reflected.

The fourth display method is a sheet preview mode. In the sheet preview mode, an output state representing how to output sheets after imposition is displayed in the preview area 902.

Note that these modes can be switched by manipulating a mode switching field 904. The mode switching field 904 adopts a pull-down menu. The user selects an arbitrary one of modes registered in this pull-down menu, thereby switching to the mode that he intended.

Various operations on the UI window 900 can be achieved by commands registered in various menus and tool bar (made up of icons) 905 at the top of the UI window 900.

<Example of Arrangement of Another Document Processing System>

The document processing system shown in FIG. 1 is a standalone system. Also, a server-client system which expands the system shown in FIG. 1 can create and edit a book file by nearly the same arrangement and sequence. In this case, a server manages book files and the print process.

Figure 12:
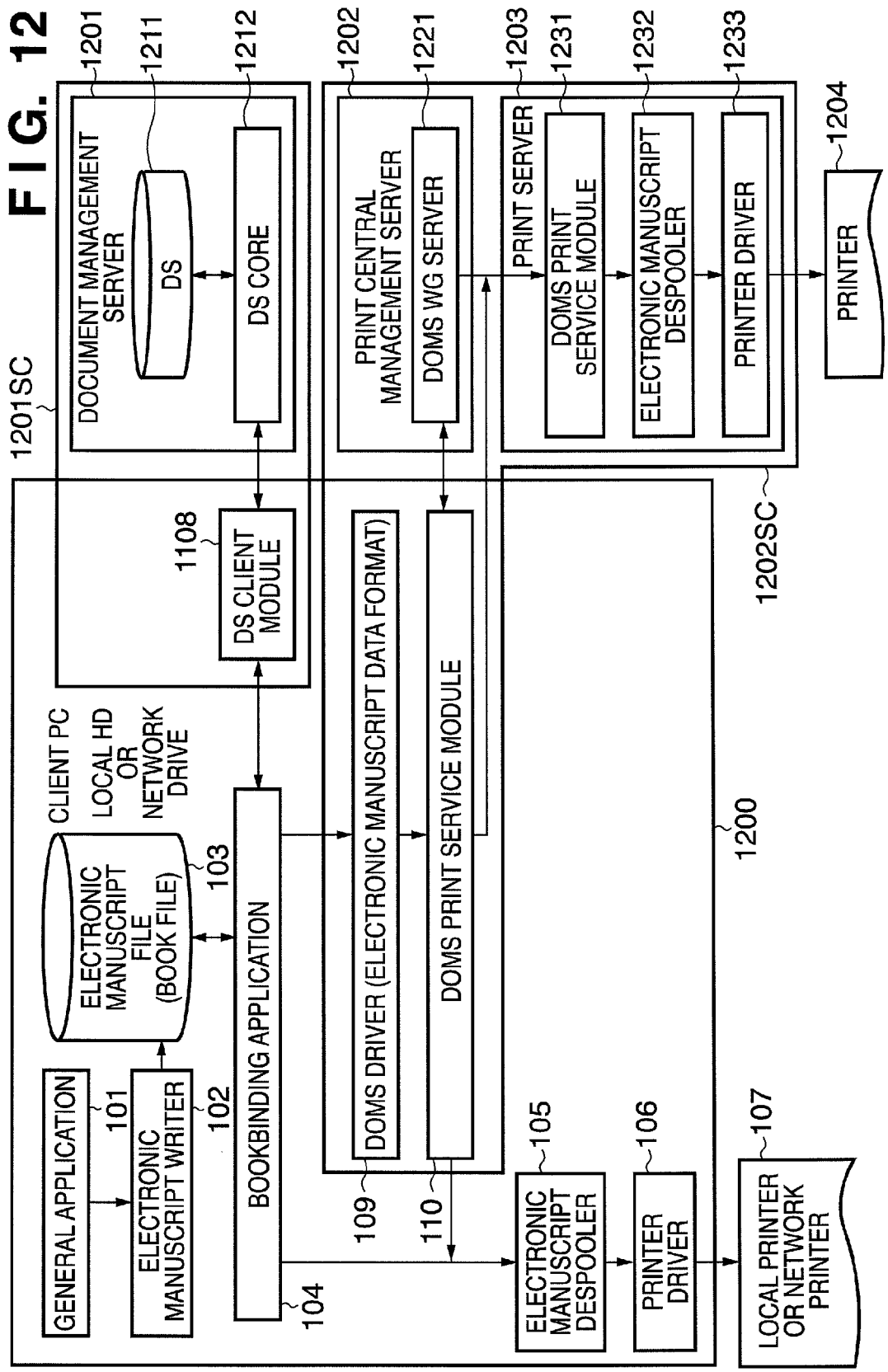
FIG. 12 is a block diagram showing the arrangement of a server-client document processing system according to the embodiment of the present invention.

FIG. 12 is a block diagram showing the arrangement of a server-client document processing system according to the embodiment of the present invention.

The server-client document processing system has an arrangement in which a DOMS driver 109, DOMS print service module 110, and DS client module 1108 are added to a standalone client document processing system 1200 shown in FIG. 1.

Note that DOMS is a short for Document Output Management Service, and serves as a client module. Also, DS is a short for Document Service. In case of the arrangement shown in FIG. 12, the client document processing system 1200 serves as a client PC for a document management server 1201, print central management server 1202, and print server 1203.

To the client document processing system 1200, the document management server 1201, print central management server 1202, and print server 1203 are connected. These servers are normally connected to the client document processing system 1200 via a network. When these servers also serve as clients, they are connected via inter-process communications that simulate communications between networks.

In FIG. 12, the two servers, that is, the document management server 1201 and print central management server 102 are connected to the client document processing system 1200. Alternatively, one of these servers may be present on the network.

For example, when the server connected is the document management server 1201, a document management server client system 1201SC including its client module is added to the client document processing system 1200.

When the server connected is the print central management server 1202, a print management server client system 1202SC including its client module is added to the client document processing system 1200.

The document management server 1201 stores book files created and edited by the bookbinding application 104. When the document management server 1201 manages book files, the book files are stored in a database (DB) 1211 of the document management server 1201 in place of or in addition to a local HD of the client document processing system 1200. Storage and reading between the bookbinding application 104 and the document management server 1201 are implemented via the DS client module 1108 and a DS core 1212.

The print central management server 1202 manages printing of book files stored in the client document processing system 1200 or document management server 1201. A print request at a client is sent to a DOMS WG server module 1221 of the print central management server 1202 via the DOMS driver 109 and DOMS print service module 110.

When printing by the printer 107 of the client document processing system 1200, the print central management server 1202 passes electronic manuscript data to the electronic manuscript despooler 105 via the DOMS print service module 110. When printing by the print server 1203, the print central management server 1202 sends electronic manuscript data to the DOMS print service module 110 of the print server 1203.

The print central management server 1202 performs security check about the authority of a user who issued a print request to the stored book file, and saves logs of the print process. In this way, the document processing system can be implemented as the standalone system and as the client-server system.

<Variable Printing>

The bookbinding application 104 can set a variable data field for executing variable data printing as a page attribute of a generated book file.

A generation example of a variable page for achieving VDP (Variable Data Printing) will be described with reference to FIG. 13.

Figure 13:
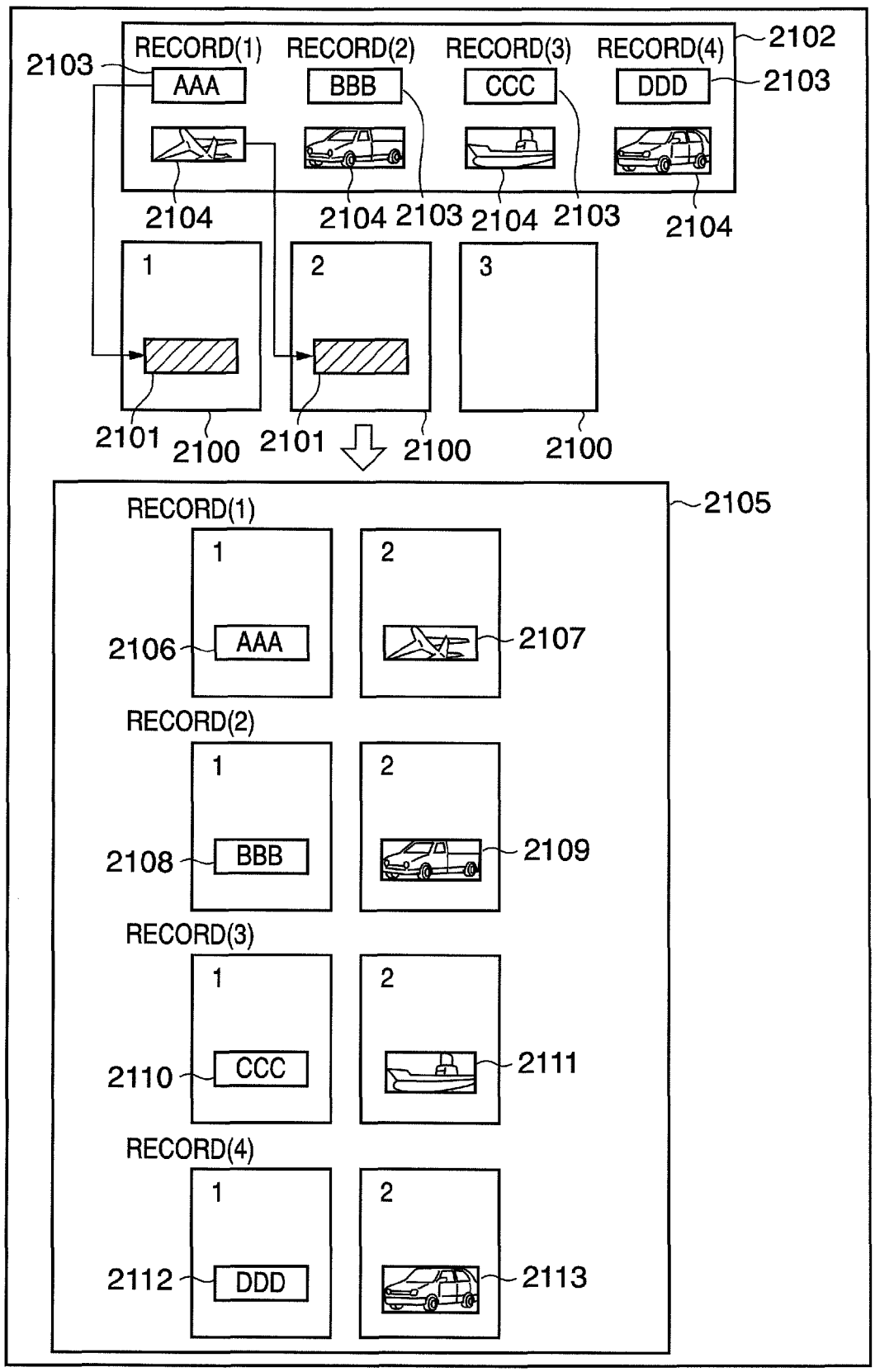
FIG. 13 is a view for explaining a generation example of a variable page for variable data printing according to the embodiment of the present invention.

FIG. 13 is a view for explaining a generation example of a variable page for variable data printing according to the embodiment of the present invention.

Reference numeral 2100 denotes each manuscript page included in an electronic manuscript. Reference numeral 2101 denotes a variable data field which is an area where variable data is allocated. It is possible to lay out a plurality of variable data fields 2101 on the manuscript page 2100, or not to lay out even one variable data field 2101. The bookbinding application 104 can insert data from a database connected to the host computer 100 into the variable data field 2101, customize the layout of the variable data field 2101, and print.

Reference numeral 2102 denotes a database connected so that the bookbinding application 104 running on the host computer 100 can acquire variable data. The database 2102 is held in, for example, the external memory 211, or may also be held in an external storage connected on a network. The database 2102 stores identifiers called records, and the bookbinding application 104 can replace data of the manuscript page 2100 for each record. In this example, data of four records (1) to (4) are set in the database 2102. Text data 2103 and image data 2104 are set in each of records (1) to (4) in the database 2102.

That is, the database 2102 has data of records (record data), and each record data has data of data items (called variable data).

As data of the data items, the text data 2103 and image data 2104 may be directly stored in the database 2102, or the URIs of their storage destinations may also be described as an external reference.

In this example, it is set to insert the text data 2103 into the variable data field 2101 set on the first manuscript page, and the image data 2104 into the variable data field 2101 set on the second manuscript page.

Setting of the variable data field 2101 and setting of association with data in the database 2102 will be described later. Reference numeral 2105 denotes an example of manuscript pages in which data in the database 2102 are actually inserted.

When variable data of record (1) are inserted, manuscript pages are laid out by inserting text data "AAA" 2106 into the first manuscript page, and image data (airplane image) 2107 into the second manuscript page.

When variable data of record (2) are inserted, manuscript pages are laid out by inserting text data "BBB" 2108 into the first manuscript page, and image data (truck image) 2109 into the second manuscript page.

When variable data of record (3) are inserted, manuscript pages are laid out by inserting text data "CCC" 2110 into the first manuscript page, and image data (ship image) 2111 into the second manuscript page.

When variable data of record (4) are inserted, manuscript pages are laid out by inserting text data "DDD" 2112 into the first manuscript page, and image data (car image) 2113 into the second manuscript page.

Since no variable data field is set on the third manuscript page, no data insertion process is executed. Even if no data insertion process is executed, the third manuscript page is printed for all records. In this way, variable data printing repeats printing by the number of manuscript pages×the number of records.

A variable data printing editor for setting variable data printing including setting of a variable data field will be explained with reference to FIG. 14.

Figure 14:
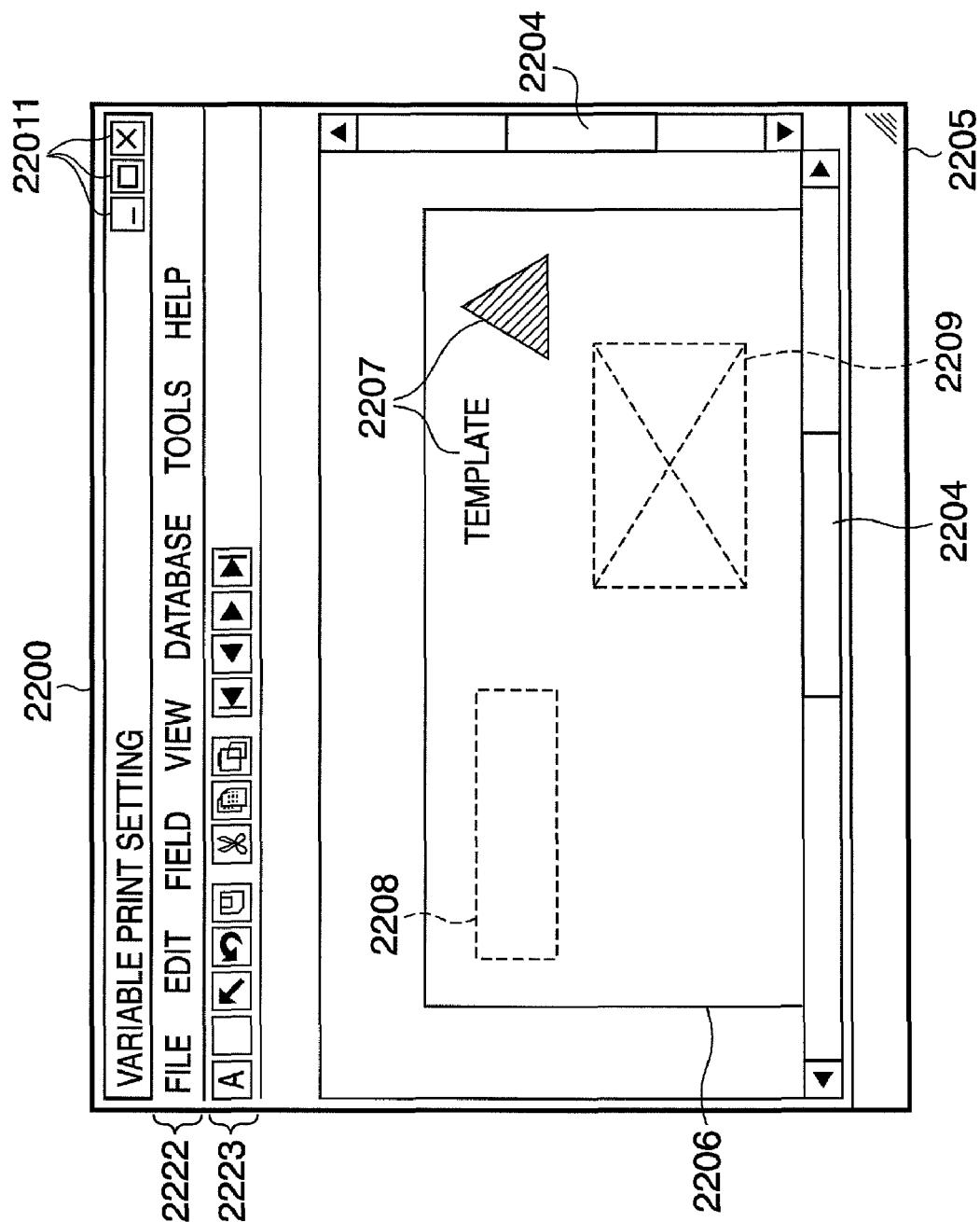
FIG. 14 is a view showing a UI window of a variable data printing editor for setting variable data printing according to the embodiment of the present invention.

FIG. 14 is a view showing a UI window of the variable data printing editor for setting variable data printing according to the embodiment of the present invention.

The variable data printing editor is launched from the bookbinding application 104, and can set a variable data field on each logical page of a book file. To launch the variable data printing editor from the bookbinding application 104, for example, the user selects "variable data printing editor" from the menu 905 while selecting one logical page in the preview area 902 of the UI window 900 (FIG. 9) of the bookbinding application 104. Alternatively, the user selects "variable data printing editor" from a menu appearing upon right-clicking of the mouse while selecting one logical page. The variable data printing editor may also be launched with various controls such as a tool button.

Reference numeral 2200 denotes a whole UI window (whole document setting window) of the variable data printing editor. When the variable data printing editor starts, the whole document setting window 2200 appears. Reference numeral 22011 denotes a button group for minimizing, maximizing, or closing the whole document setting window 2200. Reference numeral 2222 denotes a menu bar for performing various operations of the variable data printing editor. Reference numeral 2223 denotes a tool button group for performing various operations of the variable data printing editor. The tool button group 2223 allows the user to select an operation provided by the menu bar 2222 by a simple manipulation.

Reference numeral 2204 denotes a scroll bar displayed when the variable data printing editor cannot display an entire manuscript page to be processed. The scroll bar 2204 allows the user to edit an entire manuscript page by scrolling the entire window. Reference numeral 2205 denotes a grab control of the variable data printing editor. The grab control 2205 allows the user to arbitrarily change the window size with the mouse pointer.

Reference numeral 2206 denotes a manuscript page to be edited by the variable data printing editor. The variable data printing editor may prepare a page move function for manuscript pages so as to move a page without returning to the bookbinding application 104. Reference numeral 2207 denotes an object rendered on the manuscript page 2206. The variable data printing editor has a function of setting only a variable data field, and cannot edit another object on the manuscript page.

Reference numeral 2208 denotes a text variable data field for inserting text data. Reference numeral 2209 denotes an image variable data field for inserting image data. The embodiment uses the term "variable data field" when text and image variable data fields need not be distinguished from each other. These variable data fields can be created by selecting a variable data field creation function with the menu bar 2222 or tool button group 2223, and rendering rectangles with the mouse cursor.

A database setting window for setting a database connected to set data to be inserted into a variable data field will be explained with reference to FIG. 15.

Figure 15:
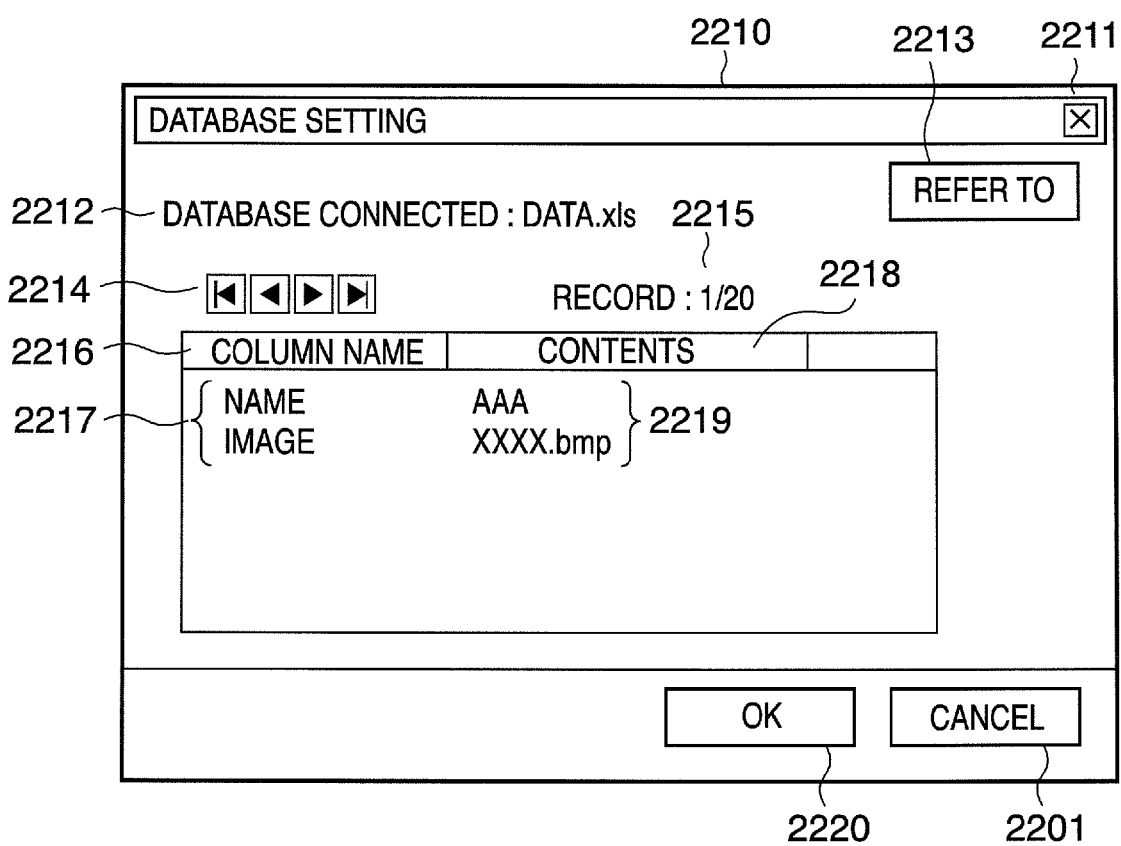
FIG. 15 is a view showing an example of a database setting window according to the embodiment of the present invention.

FIG. 15 is a view showing an example of the database setting window according to the embodiment of the present invention.

Reference numeral 2210 denotes a database setting window; and 2211, a button for closing the database setting window 2210. The database setting window 2210 can be displayed by selecting it with the menu bar 2222 or tool button group 2223 on the whole document setting window 2200 of the variable data printing editor.

Reference numeral 2212 denotes an area where the database file name of a connected database is displayed. If a database has already been connected, the area 2212 displays the file name of the connected database. If no database is connected, the area 2212 is blank. To connect a database, the user clicks a reference button 2213 to display a database file reference dialog (not shown), and designates a database file to be connected. If the user selects a database file with the reference button 2213 during connection to another database, the connection switches to the selected database. The bookbinding application 104 can connect to only one database, and cannot connect to a plurality of databases.

Reference numerals 2214 to 2219 denote various kinds of control which become valid during connection to a database and represent the contents of the connected database. Reference numeral 2214 denotes a record move button group to move a record in the connected database. Reference numeral 2215 denotes an area (n/N) representing the total number (N) of records in the connected database and the number (n) of a record whose contents are displayed at present. In this example, the total number N of records=20, and a record (1/20) having the record number n=1 is displayed.

Reference numeral 2216 denotes a column name set for the connected database. The column name represents the attribute of each record data in the database. In the example of FIG. 15, the database has attributes "name" and "image" 2217.

Reference numeral 2218 denotes a value (data) corresponding to the column name of each record in the connected database. In FIG. 15, data of the first record has a value "AAA" as the attribute "name", and a value "XXXX.bmp" as the attribute "image". As the user moves a record to be displayed with the record move button group 2214, the contents of the value 219 also change according to the moved record number.

An operation to associate a variable data field with data in the database by the variable data printing editor will be explained with reference to FIG. 16.

FIG. 16 is a view for explaining an operation of the variable data printing editor according to the embodiment of the present invention.

In FIG. 16, the column name "name" of a record to be inserted is set in a text variable data field 2310. As the setting method, it suffices to set the column of a connected database on, for example, a text variable data field property setting window (not shown). A plurality of database columns may be set in the text variable data field.

The column name "image" of a record to be inserted is set in an image variable data field 2311. As the setting method, it suffices to set the column of a connected database on, for example, an image variable data field property setting window (not shown). The number of database columns settable in the image variable data field is one.

Figure 17:
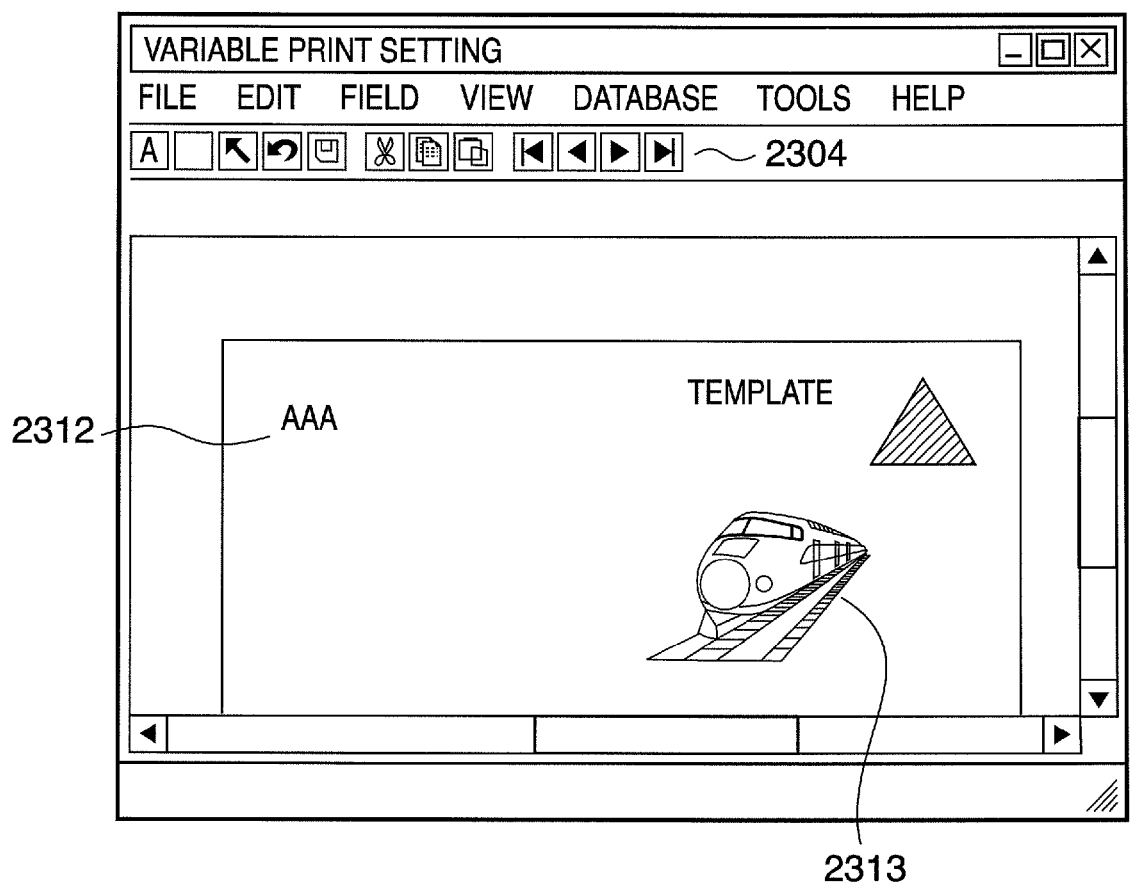
FIG. 17 is a view showing an example of a preview on the variable data printing editor according to the embodiment of the present invention.

FIG. 17 shows an example of a preview when records are actually inserted in the setting state of FIG. 16. From this preview, the user can confirm a state in which database data set in the variable data fields are inserted. In FIG. 17, reference numeral 2312 denotes a state in which the text value "AAA" of the column "name" is inserted in the text variable data field 2310 in FIG. 16.

Reference numeral 2313 denotes a state in which the image value (train image) of the column "image" is inserted in the image variable data field 2311 in FIG. 16. At this time, no preview can be displayed if an error occurs in a data format to a set column or data is omitted.

Reference numeral 2304 denotes a record move button group to move a record in the database. The user can move a record with the record move button group 2304 and confirm the preview of each record. In printing, the user can designate ON/OFF of variable data printing from the print setting dialog of the bookbinding application 104. If the user designates variable data printing OFF in the print dialog, he can print without reflecting contents set with the variable data printing editor.

According to a conventional technique, even if permanent and variable pages coexist in document data to be processed, one output destination is set as the output destination of the entire document data. The output destination cannot be changed between permanent and variable pages in document data including both permanent and variable pages. Print jobs to offset printing and digital printing (POD printing) systems cannot be generated from the document data. Print jobs must be separately generated for the respective systems, bothering the user.

To solve this problem, the embodiment provides the following print process and arrangement.

A document data print process by the bookbinding application according to the embodiment will be described with reference to FIG. 18.

Figure 18:
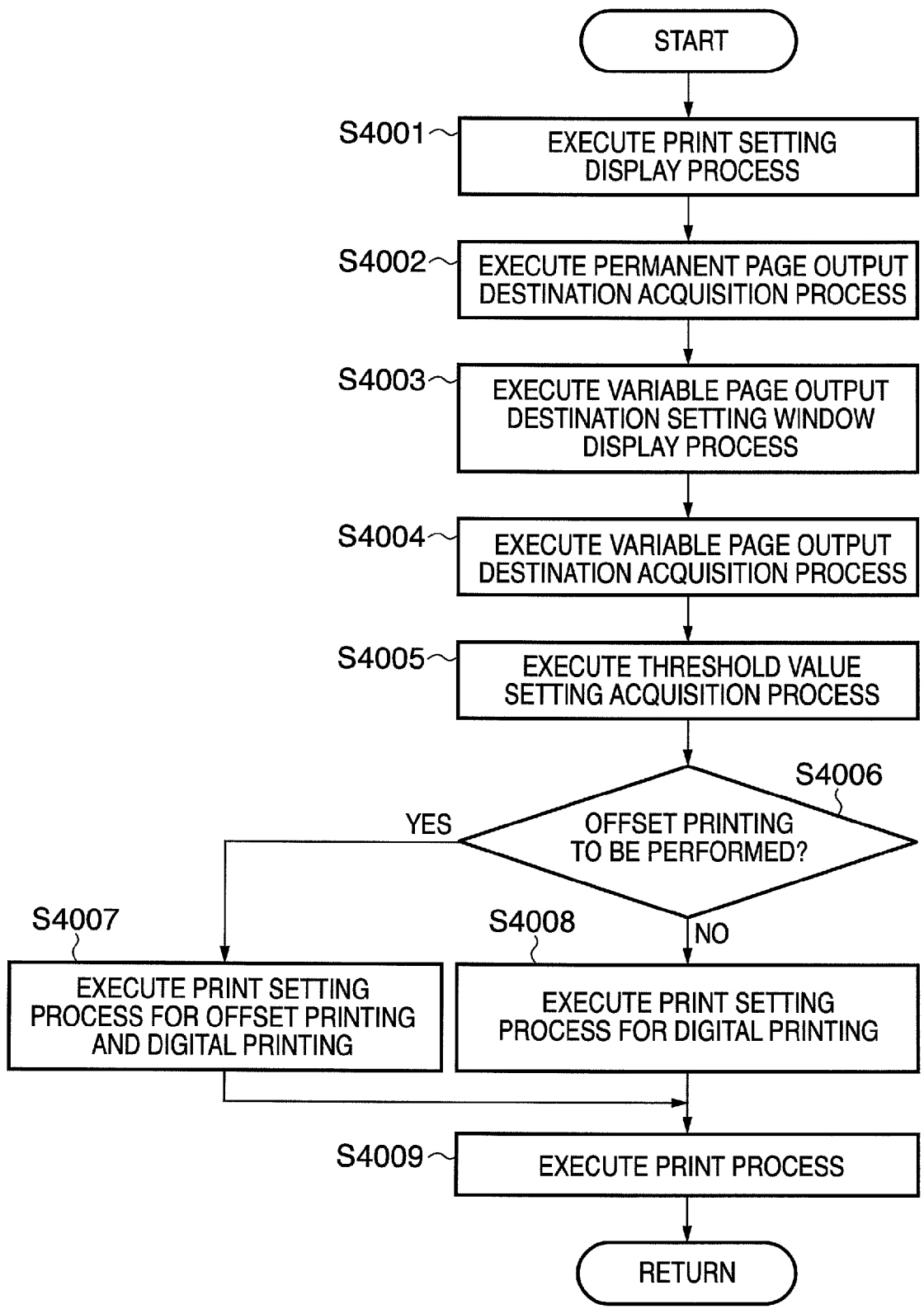
FIG. 18 is a flowchart showing a print process by the bookbinding application according to the embodiment of the present invention.

FIG. 18 is a flowchart showing the print process by the bookbinding application according to the embodiment of the present invention.

In the process of FIG. 18, assume that the first and fourth pages out of pages displayed in the preview area 902 of the UI window 900 in FIG. 9 are pages (variable pages) on which the variable data printing editor sets variable data fields. An example of printing document data formed from the pages displayed in the preview area 902 will be described. That is, an example of printing document data including both permanent and variable pages will be explained.

The bookbinding application 104 executes a print setting display process (step S4001). More specifically, when the user selects [file]—[print] from the menu 905 of the bookbinding application 104 in order to print, a print setting window 1900 (FIG. 19) for making a variety of print settings is displayed. On the print setting window 1900, the user can set a permanent page output destination (creation of RIP data and the like), set a variable page output destination, and perform a print process.

The print setting window 1900 will be explained with reference to FIG. 19.

FIG. 19 is a view showing an example of the print setting window according to the embodiment of the present invention.

The print setting window 1900 particularly comprises a setting menu 1901 for setting a permanent page output destination, and a variable page output destination setting button 1902 for setting a variable page output destination. The setting menu 1901 is a pull-down menu. The user can select a destination printer from printers registered in the pull-down menu.

The setting menu 1901 allows the user to select an electrophotographic printer, which is a digital press (plateless printing apparatus), or designate printing by an offset press as a permanent page output destination.

In the example of FIG. 19, "offset press A" is selected. However, this does not mean that print data is directly transmitted to offset press A. Since the offset press is a plate printing apparatus, the plate making apparatus 300 must make a press plate used in the offset press. Thus, the bookbinding application 104 generates press plate data which is digital printing information in a data format (PDF or TIFF) receivable by the CTP unit 108. Hence, the setting menu 1901 may provide a choice for explicitly designating creation of plate data for making a press plate used in the plate printing apparatus. In the embodiment, the choice "offset press A" means creating plate data for making a press plate used in the plate printing apparatus.

If the user operates an OK button 1903 on the print setting window 1900, the RAM 202 stores various settings on the print setting window 1900 as print setting information. If the user operates a cancel button 1904, various settings on the print setting window 1900 are canceled, and the print setting window 1900 disappears.

Figure 20:
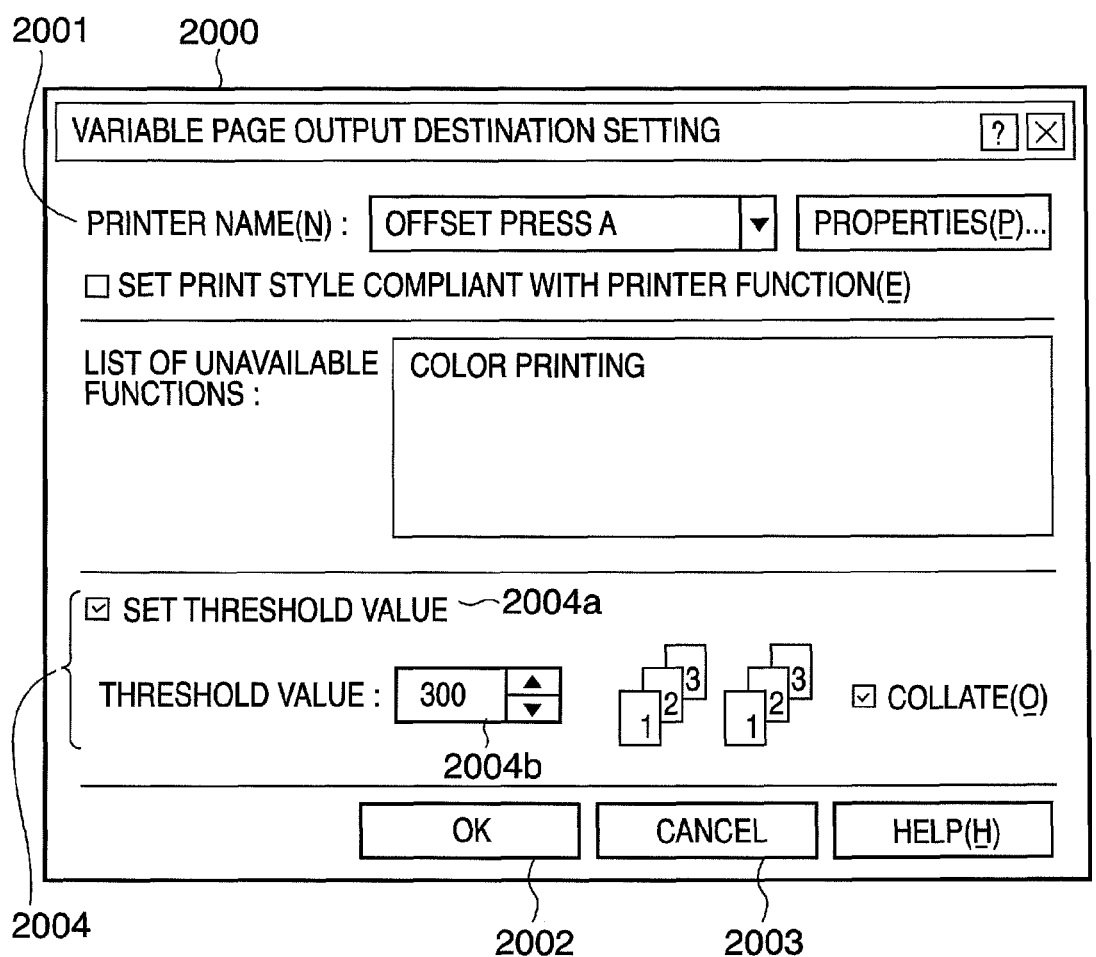
FIG. 20 is a view showing a UI window of a variable page output destination setting window according to the embodiment of the present invention.

If the user operates the variable page output destination setting button 1902, a variable page output destination setting window 2000 shown in FIG. 20 appears. The variable page output destination setting window 2000 has a setting menu 2001 for setting a variable page output destination. The setting menu 2001 is a pull-down menu. The user can select a destination printer from printers registered in the pull-down menu.

The setting menu 2001 is used to select a variable page output destination, and displays printer choices limited to printers compatible with a printer driver installed in the host computer 100. Such a printer is an electrophotographic printer serving as a digital press (plateless printing apparatus).

If the user operates an OK button 2002 on the variable page output destination setting window 2000, the RAM 202 stores various settings on the variable page output destination setting window 2000 as print setting information. If the user operates a cancel button 2003, various settings on the variable page output destination setting window 2000 are canceled. The variable page output destination setting window 2000 disappears, and the display returns to the print setting window 1900.

Normally, the cost of offset printing is lower than that of POD (digital) printing when printing by a specific number of print sheets or more. To the contrary, when the number of print sheets is small, the cost of digital printing is lower even if permanent data are printed. The number of print sheets at which the cost becomes lower changes depending on the system.

From this, the embodiment uses a threshold value setting control 2004 to set a threshold value for printing permanent data by digital printing. The threshold value setting control 2004 has a check box 2004a for designating whether to set a threshold value for executing digital printing of permanent data. The threshold value setting control 2004 also has a threshold value setting field 2004b for setting a threshold value (number of print sheets) when executing digital printing based on the threshold value.

The threshold value setting field 2004b allows setting a threshold value only when the check box 2004a is checked. In other words, the threshold value setting control 2004 functions as control for determining whether to print permanent data in document data by offset printing.

By checking the check box 2004a, the user can designate execution of digital printing of permanent data corresponding to the threshold value. In this state, if the number of print sheets of permanent pages in document data to be processed is lower than that of print sheets designated in the threshold value setting field 2004b, the permanent pages in the document data are printed by digital printing. In FIG. 20, the threshold value is "300". When the number of print sheets of permanent pages in document data to be processed is lower than 300, all the pages of the document data are printed by digital printing even if the document data includes both permanent and variable pages.

The setting windows shown in FIGS. 19 and 20 are merely examples, and the present invention is not limited to these setting windows. The present invention suffices to have a function (setting menu 2001 in FIG. 20) of designating the first printing apparatus for printing document data including variable pages, and a function (setting menu 1901 in FIG. 19) of designating creation of plate data for document data including no variable page.

Referring back to FIG. 18, the bookbinding application 104 executes a permanent page output destination acquisition process on the basis of an operation to the print setting window 1900 (step S4002). More specifically, the bookbinding application 104 selects and acquires, as the output destination of permanent pages in document data, an output destination selected from the setting menu 1901 of the print setting window 1900 in FIG. 19. Information representing the acquired permanent page output destination is stored as permanent page output destination information in the RAM 202.

The permanent page output destination information describes a method of generating print data to be output to the CTP unit in order to make a press plate used in the offset printer 200. The permanent page output destination information includes information for specifying the CTP unit in order to make a press plate used in the offset printer 200. That is, the permanent page output destination information need not describe information for specifying the offset printer 200. In contrast, if the printer 107 serving as a plateless printing apparatus is selected as a permanent page output destination from the setting menu 1901, the permanent page output destination information describes information representing the printer 107.

The bookbinding application 104 executes a variable page output destination setting window display process based on an operation to the print setting window 1900 (step S4003). More specifically, when the user operates the variable page output destination setting button 1902 of the print setting window 1900, the variable page output destination setting window 2000 is displayed.

The bookbinding application 104 executes a variable page output destination acquisition process based on an operation to the variable page output destination setting window 2000 (step S4004). More specifically, the bookbinding application 104 selects and acquires, as the output destination of variable pages in document data, an output destination selected from the setting menu 2001 of the variable page output destination setting window 2000. Information representing the acquired variable page output destination is stored as variable page output destination information in the RAM 202. The variable page output destination information describes a method of generating print data to be output to the printer 107, and information (e.g., printer name and IP address) representing the printer 107.

The bookbinding application 104 executes a threshold value setting acquisition process based on an operation to the variable page output destination setting window 2000 (step S4005). More specifically, the bookbinding application 104 acquires a threshold value selected in the threshold value setting field 2004b of the threshold value setting control 2004 on the variable page output destination setting window 2000 of FIG. 20. The acquired threshold value is stored in the RAM 202.

Then, the bookbinding application 104 executes a determination process to determine whether to execute offset printing of permanent pages (step S4006). More specifically, the bookbinding application 104 determines whether it is set from the setting menu 1901 to create plate data for making a press plate used in the offset press (plate printing apparatus). When the threshold value is to be set, the bookbinding application 104 compares the number of print sheets for printing permanent pages with the threshold value acquired in step S4005, and determines whether to execute offset printing of the permanent pages. For example, when the number of print sheets of permanent pages is 400 and the threshold value is 300, the number of print sheets of permanent pages is larger than the threshold value. In this case, the bookbinding application 104 determines to execute offset printing of permanent pages.

If the bookbinding application 104 determines to execute offset printing of permanent pages (YES in step S4006), it executes a print setting process to execute offset printing of permanent pages and digital printing of variable pages (step S4007). More specifically, the bookbinding application 104 divides document data of an electronic manuscript into document data for digital printing including variable pages and document data for a press plate including no variable page.

The bookbinding application 104 outputs the divided document data including variable pages to the printer driver via the electronic manuscript despooler 105. The printer driver generates print data for the destination digital printer. The bookbinding application 104 generates, from the divided document data including no variable page, plate data for making a press plate used in the plate printing apparatus.

More specifically, the bookbinding application 104 sets the CTP unit 108 so as to make the press plate of (only) permanent pages including no variable page. Also, the bookbinding application 104 sets a plateless printing apparatus serving as the output destination of a variable page print job. The bookbinding application 104 divides document data including both permanent and variable pages into document data including variable pages and document data including no variable page (including only permanent pages).

The bookbinding application 104 outputs the document data including variable pages to the printer driver via the electronic manuscript despooler 105. The printer driver generates a print job to be output to the plateless printing apparatus. The bookbinding application 104 generates, from the document data including no variable page, plate data for making a press plate used in the plate printing apparatus.

The plate data may be directly output to the CTP unit 108, or may be generated as a file and loaded into the CTP unit 108. In addition, the bookbinding application 104 independently sets the first print setting information for the print job of the document data including variable pages, and the second print setting information for the plate data of the document data including no variable page.

In the example of FIG. 9, the first and fourth pages are variable pages in a document to be printed, and a print job for digital printing is generated for these pages. The remaining pages are permanent pages, and plate data for offset printing is generated for these pages. Various kinds of information such as the print destination, the number of print sheets, and the print sheet size are generated as print setting information of the print job and plate data to the respective print destinations.

If the bookbinding application 104 determines not to execute offset printing of permanent pages (NO in step S4006), that is, even permanent pages are to be printed by digital printing, the bookbinding application 104 generates a print job and print setting information for digital printing of all the pages of the document data to be printed.

More specifically, even if document data includes both permanent and variable pages, the bookbinding application 104 sets the first printing apparatus as the output destination of the print job of the document data. The bookbinding application 104 outputs the document data to the printer driver 106 via the electronic manuscript despooler 105. The printer driver 106 generates a print job to be output to the plateless printing apparatus. In addition, the bookbinding application 104 sets the first print setting information for the print job of the document data.

The bookbinding application 104 executes a print process by transmitting the print job to the plateless printing apparatus in accordance with the print job to the plateless printing apparatus and the print setting information of the print job that have been acquired by the process in step S4007 or S4008 (step S4009).

As described above, the CTP unit 108 loads the plate data generated in step S4007 in order to make a press plate to be used in the plate printing apparatus. Then, the plate-making apparatus 300 makes a press plate. The press plate-making technique is well-known and is not directly related to the present invention, so a detailed description thereof will be omitted.

By the print process in FIG. 18, the print destinations and print setting information of permanent and variable pages can be designated for document data including both permanent and variable pages. Print jobs complying with the designated print destinations and print setting information can be generated.

A document data imposition process by the bookbinding application according to the embodiment will be described.

According to a conventional technique, the available sheet size differs between offset printing and digital printing, and the imposition method to be set also differs between them. If permanent and variable pages coexist in document data to be processed, imposition methods specific to them cannot be set. This restricts sheets which can be output, and raises the cost. Imposition means laying out a plurality of finishing pages on a sheet, allocating one or a plurality of manuscript pages (logical pages) on each finishing page, and printing.

To solve this problem, the embodiment provides the following imposition process and arrangement.

A document data imposition process by the bookbinding application according to the embodiment will be described with reference to FIG. 21.

Figure 21:
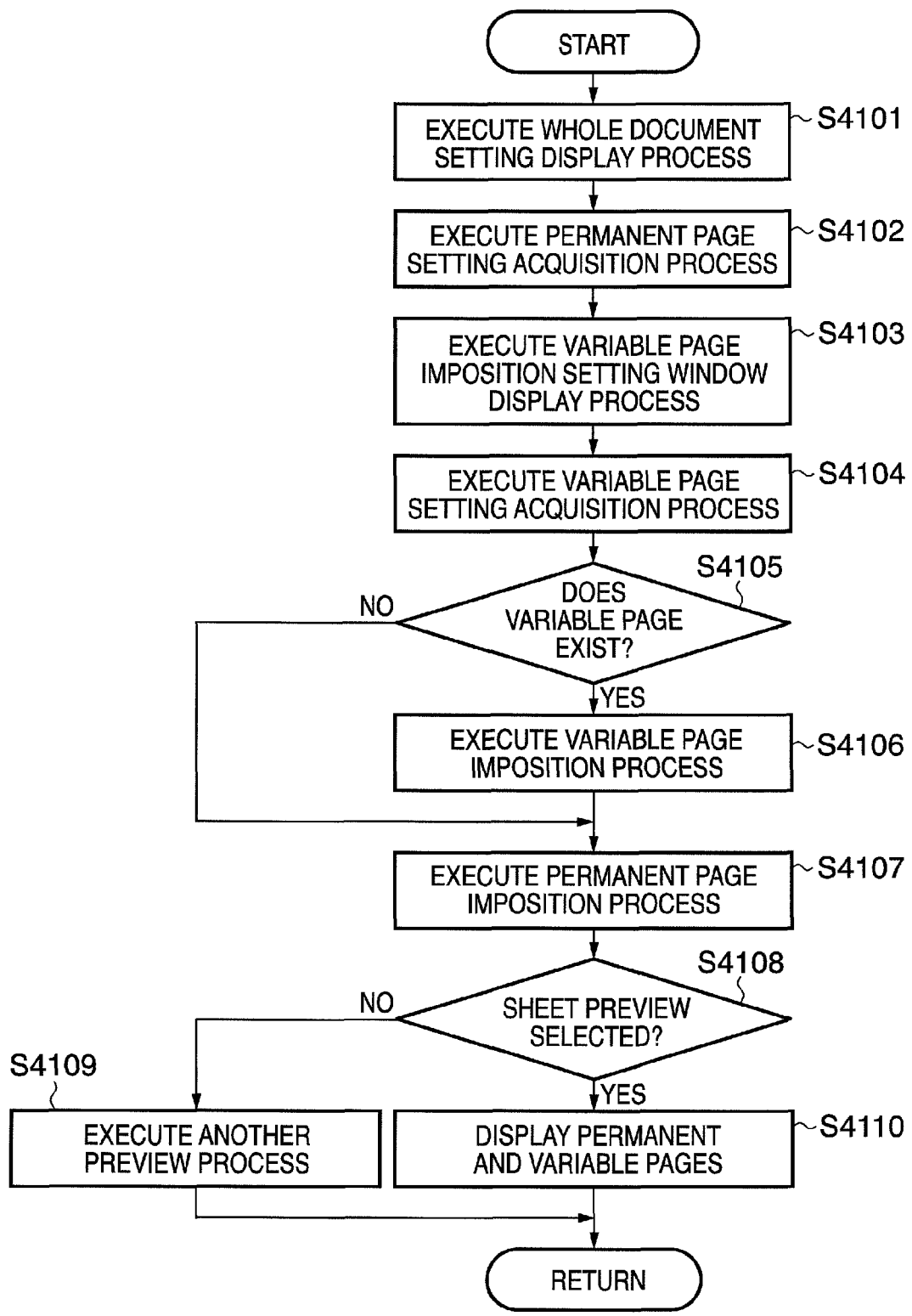
FIG. 21 is a flowchart showing a document data imposition process by the bookbinding application according to the embodiment of the present invention.

FIG. 21 is a flowchart showing the document data imposition process by the bookbinding application according to the embodiment of the present invention.

In the process of FIG. 21, assume that the first and fourth pages out of pages displayed in the preview area 902 of the UI window 900 in FIG. 9 are pages (variable pages) on which the variable data printing editor sets variable data fields. An example of imposing document data formed from the pages displayed in the preview area 902 will be described. That is, an example of imposing document data including both permanent and variable pages will be explained.

The bookbinding application 104 executes a whole document setting display process (step S4101). More specifically, when the user selects [print style]—[whole document setting] from the menu 905 of the bookbinding application 104, a whole document setting window 2200 (FIG. 22) appears. On the whole document setting window 2200, the user can make a permanent page imposition setting and variable page imposition setting.

The whole document setting window 2200 will be explained with reference to FIG. 22.

Figure 22:
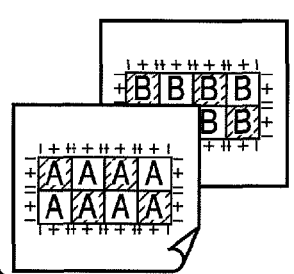
FIG. 22 is a view showing an example of a whole document setting window according to the embodiment of the present invention.

FIG. 22 is a view showing an example of the whole document setting window according to the embodiment of the present invention.

The whole document setting window 2200 has tab windows (sheet setup, page setup, finishing, edit, paper source, and quality) for making various print settings of document data. In FIG. 22, a sheet setup tab window is displayed. The whole document setting window 2200 particularly comprises a permanent page imposition setting area 2201 for setting a permanent page imposition method, and a variable page imposition setting button 2202 for setting a variable page imposition method. In addition, the whole document setting window 2200 has controls for making a variety of settings such as the output sheet size and finishing size of permanent pages.

In the permanent page imposition setting area 2201, the user can make various imposition settings such as the imposition mode, imposition type, and imposition method of permanent pages with controls such as a radio button and pull-down menu.

On the whole document setting window 2200, the finishing size is a desired size after cutting. The imposition type is the setting of the number of finishing sizes imposed on an output sheet size. For example, 1×1, 2×2, and 2×4 can be set. The imposition method is the setting of the imposition of logical pages. For example, page order and page repeat can be set. Page order is a method of imposing logical pages on a sheet in the order of 1, 2, 3, . . . . Page repeat is a method of repeating the same page on a sheet, like 1, 1, 1, . . . . Permanent pages are imposed based on these pieces of information.

If the user operates an OK button 2203 on the whole document setting window 2200, the RAM 202 stores various settings on the whole document setting window 2200 as document setting information. If the user operates a cancel button 2204, various settings on the whole document setting window 2200 are canceled, and the whole document setting window 2200 disappears.

If the user operates the variable page imposition setting button 2202, a variable page imposition setting window 2300 shown in FIG. 23 appears. The variable page imposition setting window 2300 has a variable page imposition setting area 2301 for setting a variable page imposition method. In the variable page imposition setting area 2301, the user can make various imposition settings such as the imposition mode, imposition type, and imposition method of variable pages with controls such as a radio button and pull-down menu. In addition, the variable page imposition setting window 2300 has controls for making a variety of settings such as the output sheet size and finishing size of variable pages.

If the user operates an OK button 2302 on the variable page imposition setting window 2300, the RAM 202 stores various settings on the variable page imposition setting window 2300 as document setting information. If the user operates a cancel button 2303, various settings on the variable page imposition setting window 2300 are canceled. The variable page imposition setting window 2300 disappears, and the display returns to the entire document setting window 2200.

Referring back to FIG. 21, the bookbinding application 104 executes a permanent page setting acquisition process based on an operation to the whole document setting window 2200 (step S4102). More specifically, the bookbinding application 104 acquires the document settings (output sheet size, finishing size, imposition type, and imposition method) of permanent pages that are made on the whole document setting window 2200. The acquired document setting information is stored as document setting information of permanent pages in the RAM 202.

The bookbinding application 104 executes a variable page imposition setting window display process based on an operation to the whole document setting window 2200 (step S4103). More specifically, when the user operates the variable page imposition setting button 2202 of the whole document setting window 2200, the variable page imposition setting window 2300 is displayed.

The bookbinding application 104 executes a variable page setting acquisition process based on an operation to the variable page imposition setting window 2300 (step S4104). More specifically, the bookbinding application 104 acquires the document settings of variable pages that are made on the variable page imposition setting window 2300. The acquired document setting information is stored as document setting information of variable pages in the RAM 202. Since settable items assume normal digital printing, the available sheet size of digital printing is generally smaller than that of offset printing, and selection of the imposition type also changes depending on the sheet size.

Then, the bookbinding application 104 executes a determination process to determine whether variable pages exist in document data to be processed (step S4105). In the example of FIG. 9, the first and fourth pages of the document data to be processed are variable pages. In this case, the bookbinding application 104 determines that variable pages exist.

If the bookbinding application 104 determines that variable pages exist (YES in step S4105), it executes a variable page imposition process (step S4106). More specifically, the bookbinding application 104 imposes variable pages in accordance with the document setting information of variable pages that has been acquired in step S4103. In this case, the bookbinding application 104 collects and imposes only variable pages other than permanent pages in the document data. In the example of FIG. 23, the output sheet "A3", finishing size "A4", imposition type "1×2", and imposition method "page order" are acquired as the document setting information of variable pages. The bookbinding application 104 executes the imposition process in accordance with these pieces of information.

If no variable page exists (NO in step S4105), or the variable page imposition process ends, the bookbinding application 104 executes a permanent page imposition process (step S4107). More specifically, the bookbinding application 104 imposes permanent pages in accordance with the document setting information of permanent pages that has been acquired in step S4102. In this case, the bookbinding application 104 collects and imposes only permanent pages other than variable pages in the document data. In the example of FIG. 22, the output sheet "A1", finishing size "A4", imposition type "2×4", and imposition method "page repeat" are acquired as the document setting information of permanent pages. The bookbinding application 104 executes the imposition process in accordance with these pieces of information.

Figure 24A:
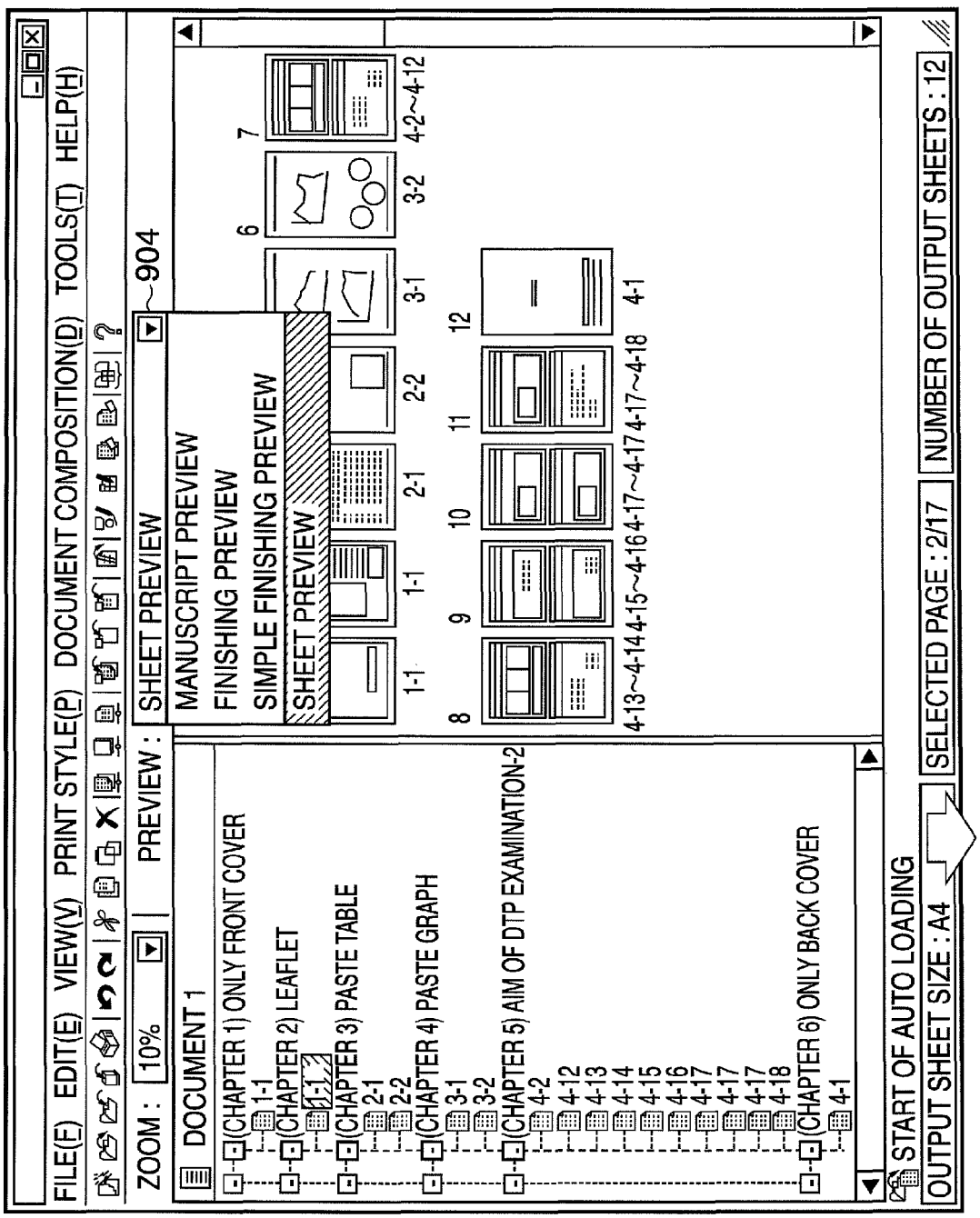

The bookbinding application 104 executes a determination process based on an operation to the mode switching field 904 of the UI window 900 to determine whether the user has selected a sheet preview (step S4108). If the user has selected the sheet preview mode (YES in step S4108), the bookbinding application 104 displays permanent and variable pages (step S4110). In this sheet preview mode, the imposition states of imposed permanent and variable pages are displayed. FIGS. 24A and 24B show an example of this display. When the user selects the sheet preview in the mode switching field 904 in FIG. 24A, the imposition states of imposed permanent and variable pages are displayed in a permanent page preview area 2401 and variable page preview area 2402, respectively, as shown in FIG. 24B.

By the imposition process in FIG. 21, permanent and variable pages in document data including both the permanent and variable pages can be imposed.

As described above, according to the embodiment, plate data for offset printing and a print job for digital printing can be generated from one document data by designating the output destination of variable pages separately from that of permanent pages.

The embodiment adopts the threshold value process to determine whether to execute offset printing of permanent pages. Depending on the number of output sheets, only digital printing can be used, preventing the rise of cost required to perform offset printing.

Since the imposition method of variable pages can be designated separately from that of permanent pages, different impositions and sheet sizes can be set for offset printing and digital printing. In particular, variable pages are imposed according to settings, and this can suppress the sheet cost.

Another Embodiment

According to a conventional technique, the two imposition methods, that is, page order and page repeat are selectable. Assuming that the number of records and the number of pages are variable, it is difficult for the user to select a proper imposition method. The selection may raise the sheet cost.

To suppress the further increase in sheet cost, another embodiment is directed to an arrangement which implements an auto imposition function of automatically switching the imposition method between page order and page repeat internally.

A document data imposition process by a bookbinding application according to this embodiment will be explained with reference to FIG. 25.

Figure 25:
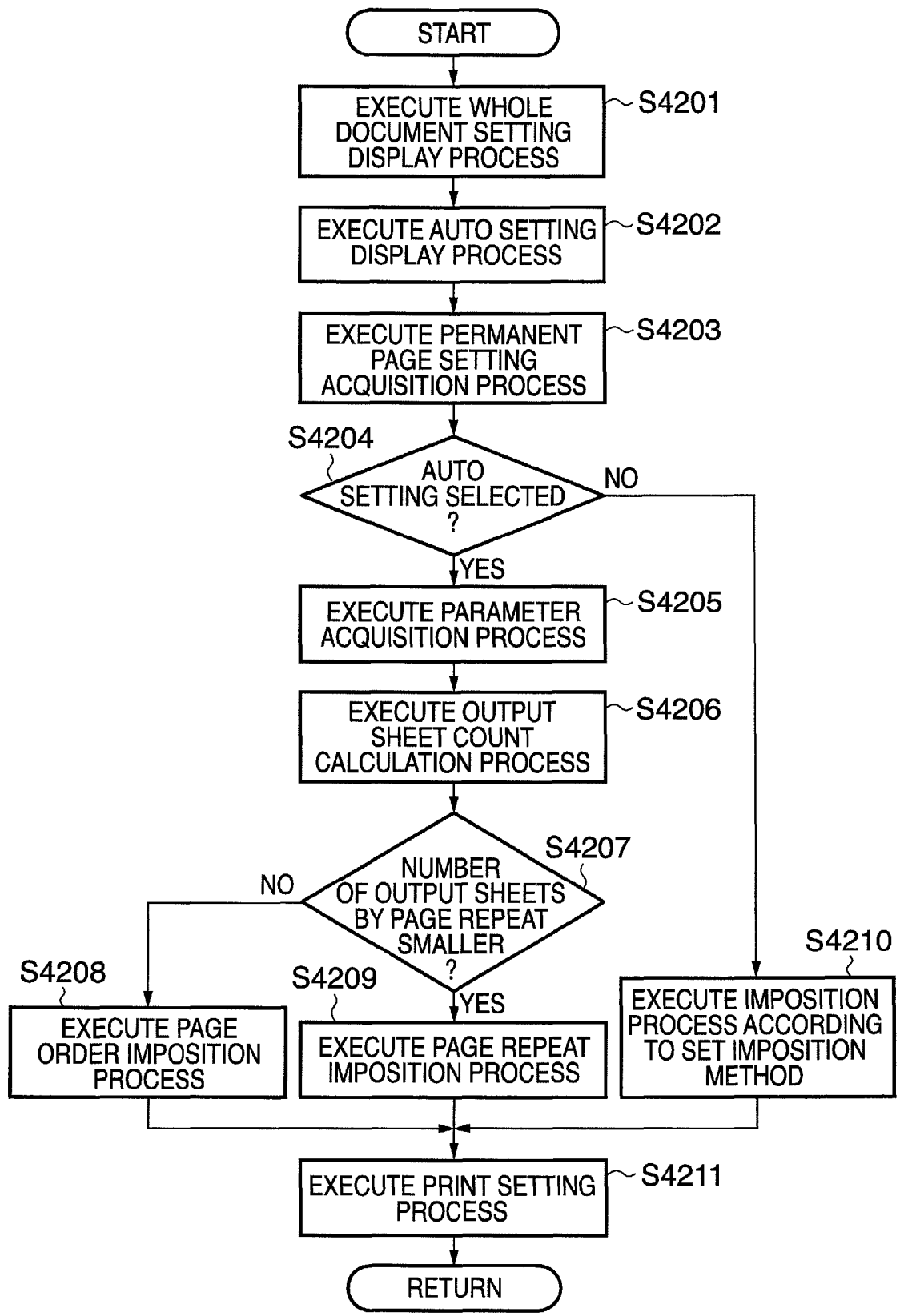
FIG. 25 is a flowchart showing a document data imposition process by a bookbinding application according to another embodiment of the present invention.

FIG. 25 is a flowchart showing the document data imposition process by the bookbinding application according to the embodiment of the present invention.

In the process of FIG. 25, assume that the first and fourth pages out of pages displayed in a preview area 902 of a UI window 900 in FIG. 9 are pages (variable pages) on which a variable data printing editor sets variable data fields. An example of imposing document data formed from the pages displayed in the preview area 902 will be described. That is, an example of imposing document data including both permanent and variable pages will be explained.

A bookbinding application 104 executes a whole document setting display process (step S4201). More specifically, when the user selects [print style]—[whole document setting] from a menu 905 of the bookbinding application 104, a whole document setting window 2600 (FIG. 26) appears. On the whole document setting window 2600, the user can make an auto imposition setting in addition to a permanent page imposition setting and variable page imposition setting.

The whole document setting window 2600 will be explained with reference to FIG. 26.

FIG. 26 is a view showing an example of the whole document setting window according to the embodiment of the present invention.

The whole document setting window 2600 has basically the same arrangement as that of the whole document setting window 2200 (FIG. 22) in the above-described embodiment. The whole document setting window 2600 further provides "auto" for executing auto imposition as an imposition method in a permanent page imposition setting area 2601.

When the user selects "auto" as the imposition method, "page order" or "page repeat" is adaptively selected based on the number of records for variable pages of document data to be printed, the number of permanent pages, and document setting information of permanent pages.

Referring back to FIG. 25, the bookbinding application 104 executes an auto setting display process to display "auto" as the default setting of the imposition method in the permanent page imposition setting area 2601 on the whole document setting window 2600 (step S4202).

The bookbinding application 104 executes a permanent page setting acquisition process based on an operation to the whole document setting window 2600 (step S4203). More specifically, the bookbinding application 104 acquires the document settings (output sheet size, finishing size, imposition type, and imposition method) of permanent pages that are made on the whole document setting window 2600. The acquired document setting information is stored as document setting information of permanent pages in a RAM 202.

Figure 27A:
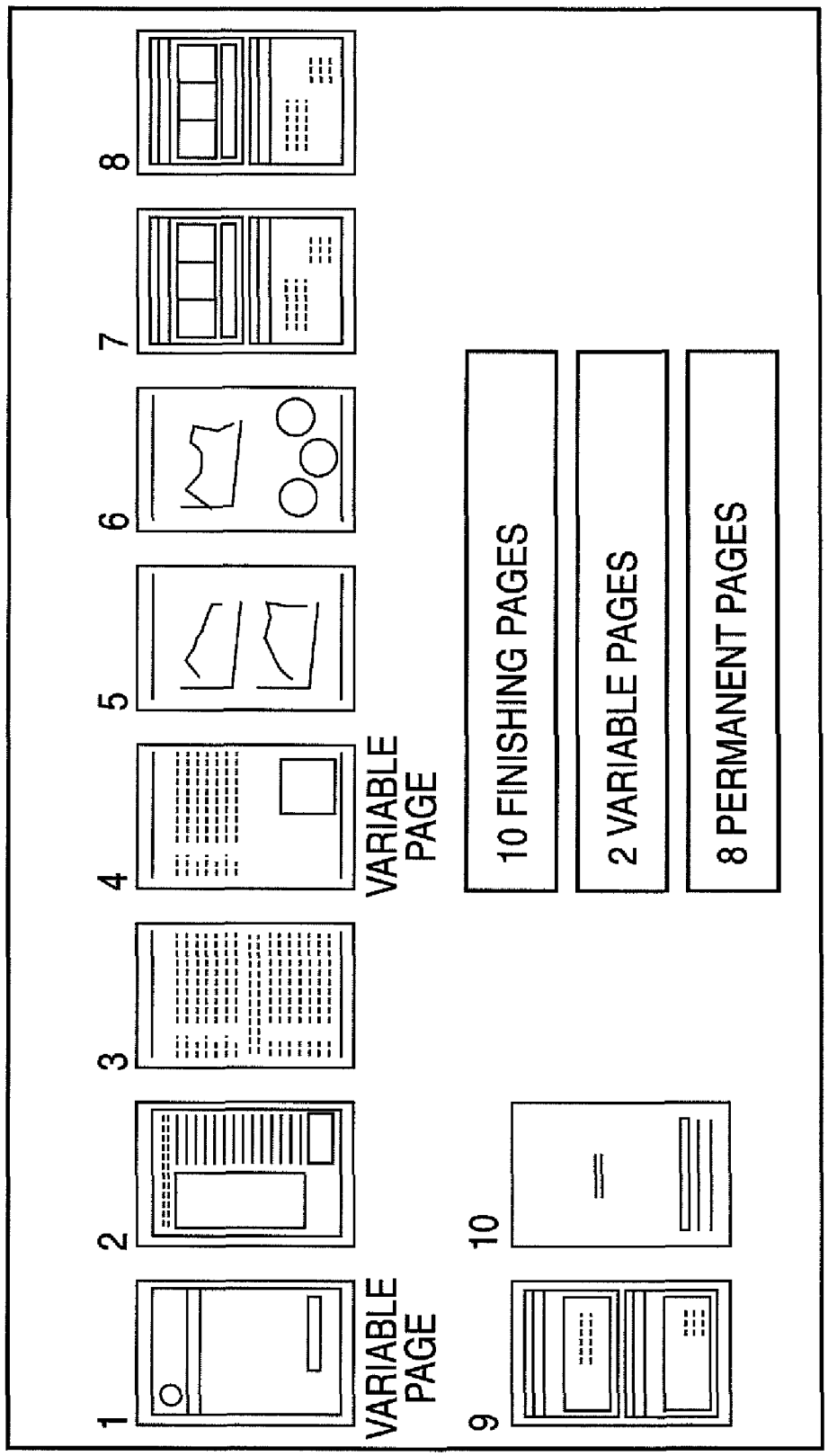
FIG. 27A is a view for explaining a concrete example of an imposition process according to the embodiment shown in FIG. 25.

Assume that document data shown in FIG. 27A is to be printed. This document data is formed from 10 finishing pages, and the first and fourth pages are variable pages (the number of records for a variable data field is "100"). The document settings of the document data are the output sheet "A1", finishing size "A4", imposition type "2×4", and imposition method "auto".

After that, the bookbinding application 104 executes a determination process to determine whether "auto" has been selected (step S4204). If no "auto" has been selected (NO in step S4204), the bookbinding application 104 executes an imposition process according to the set imposition method (step S4210).

If "auto" has been selected (YES in step S4204), the bookbinding application 104 executes a parameter acquisition process (step S4205). More specifically, the bookbinding application 104 acquires the number of records for a variable page in document data to be printed, and the number of permanent pages. These parameters are used in an output sheet count calculation process in step S4206. In the example of FIG. 27A, the number of records is 100, and the number of permanent pages is 8.

Figure 27B:
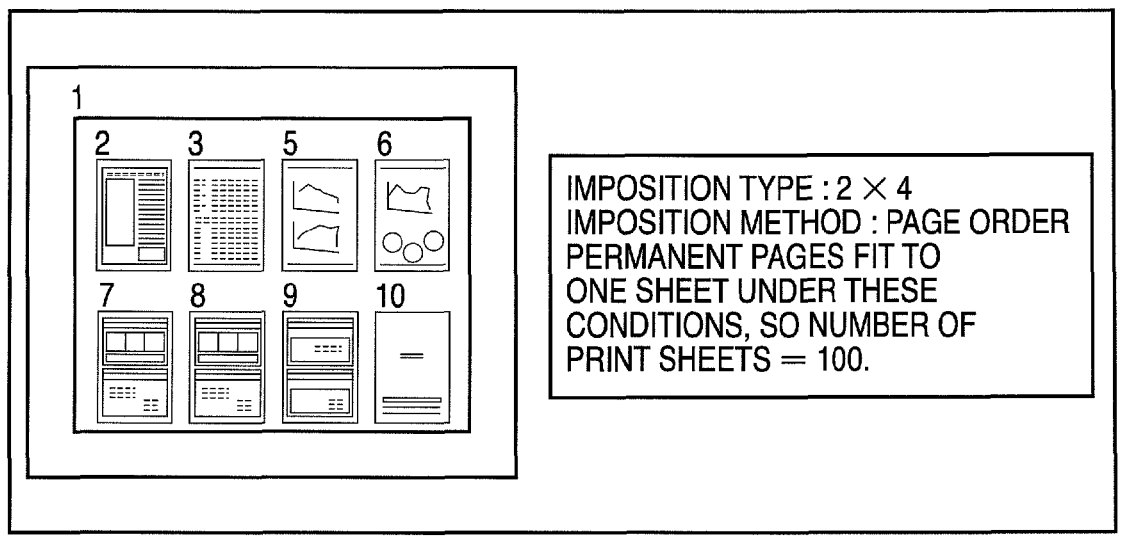
FIG. 27B is a view for explaining a concrete example of the imposition process according to the embodiment shown in FIG. 25.
Figure 27C:
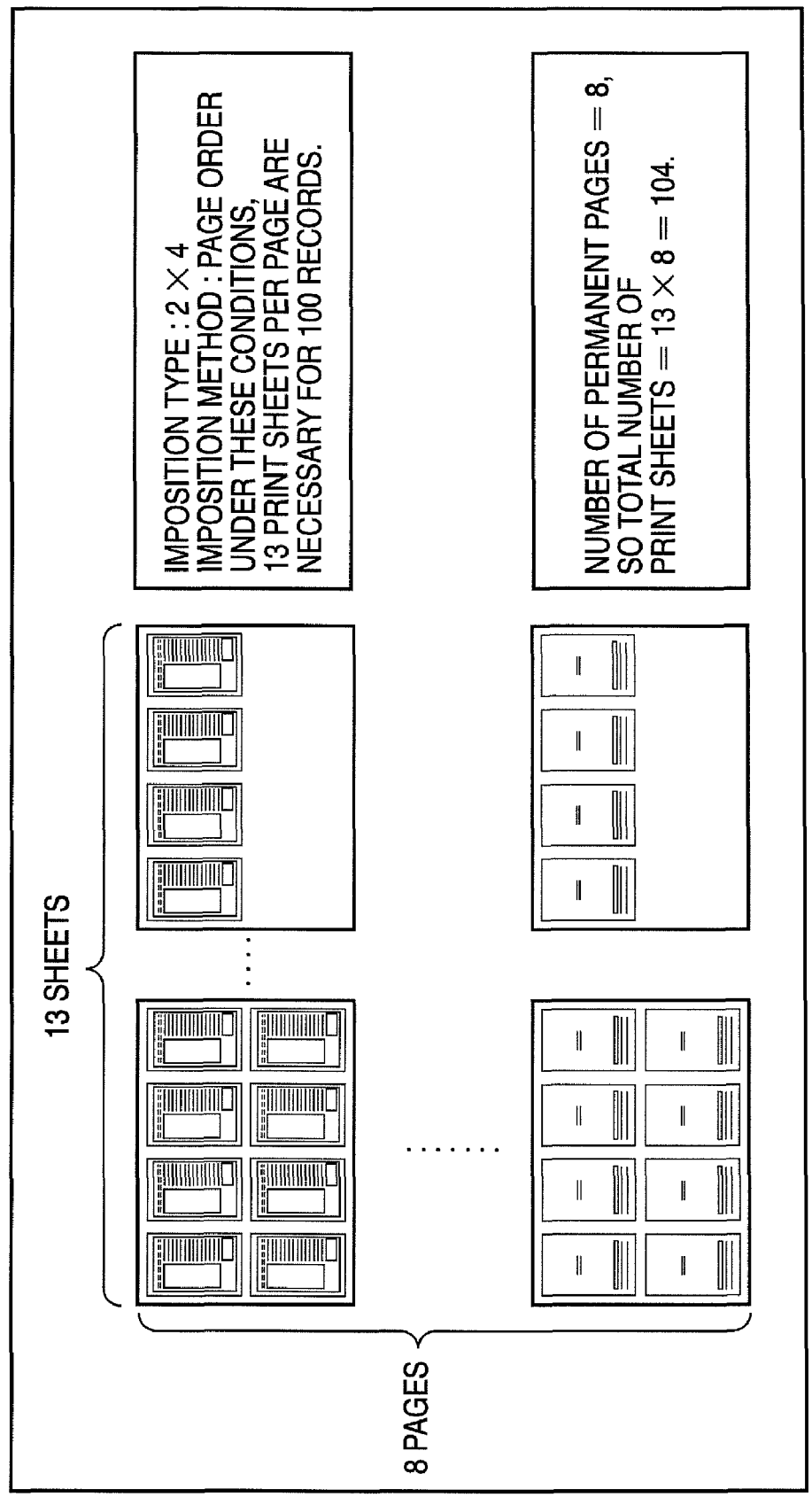
FIG. 27C is a view for explaining a concrete example of the imposition process according to the embodiment shown in FIG. 25.

The bookbinding application 104 executes a permanent page output sheet count calculation process (step S4206). More specifically, the bookbinding application 104 calculates the numbers of output sheets by the imposition methods "page order" and "page repeat" based on the parameters acquired in step S4205 and the document setting information of permanent pages. In the example shown in FIG. 27A, since the imposition type "2×4" is set, the number of output sheets necessary to print permanent pages by the imposition method "page order" is 100 (FIG. 27B). The number of output sheets necessary to print permanent pages by the imposition method "page repeat" is 104 (FIG. 27C).

The bookbinding application 104 executes a determination process to compare the numbers of output sheets by the imposition methods "page order" and "page repeat", and determine whether the number of output sheets by page repeat is smaller (step S4207). More specifically, the bookbinding application 104 determines whether the number of output sheets by page repeat is smaller among the numbers of output sheets calculated in step S4206 for the two imposition methods. In the example shown in FIGS. 27A to 27C, the bookbinding application 104 determines that the number of output sheets by page order is smaller.

If the bookbinding application 104 determines that the number of output sheets by page repeat is larger (NO in step S4207), it executes a page order imposition process (step S4208). This is an imposition process based on page order, and an imposition setting complying with page order as shown in FIG. 27B is selected. The bookbinding application 104 executes a print setting process including this imposition setting (step S4211).

If the bookbinding application 104 determines that the number of output sheets by page repeat is smaller (YES in step S4207), it executes a page repeat imposition process (step S4209). This is an imposition process based on page repeat, and an imposition setting complying with page repeat as shown in FIG. 27C is selected. Then, the bookbinding application 104 executes the print setting process including this imposition setting (step S4211).

If the number of output sheets by the imposition method "page order" is equal to that by the imposition method "page repeat", either imposition method is selected. Alternatively, an imposition method capable of suppressing the print cost more is selected based on other imposition settings.

Figure 27D:
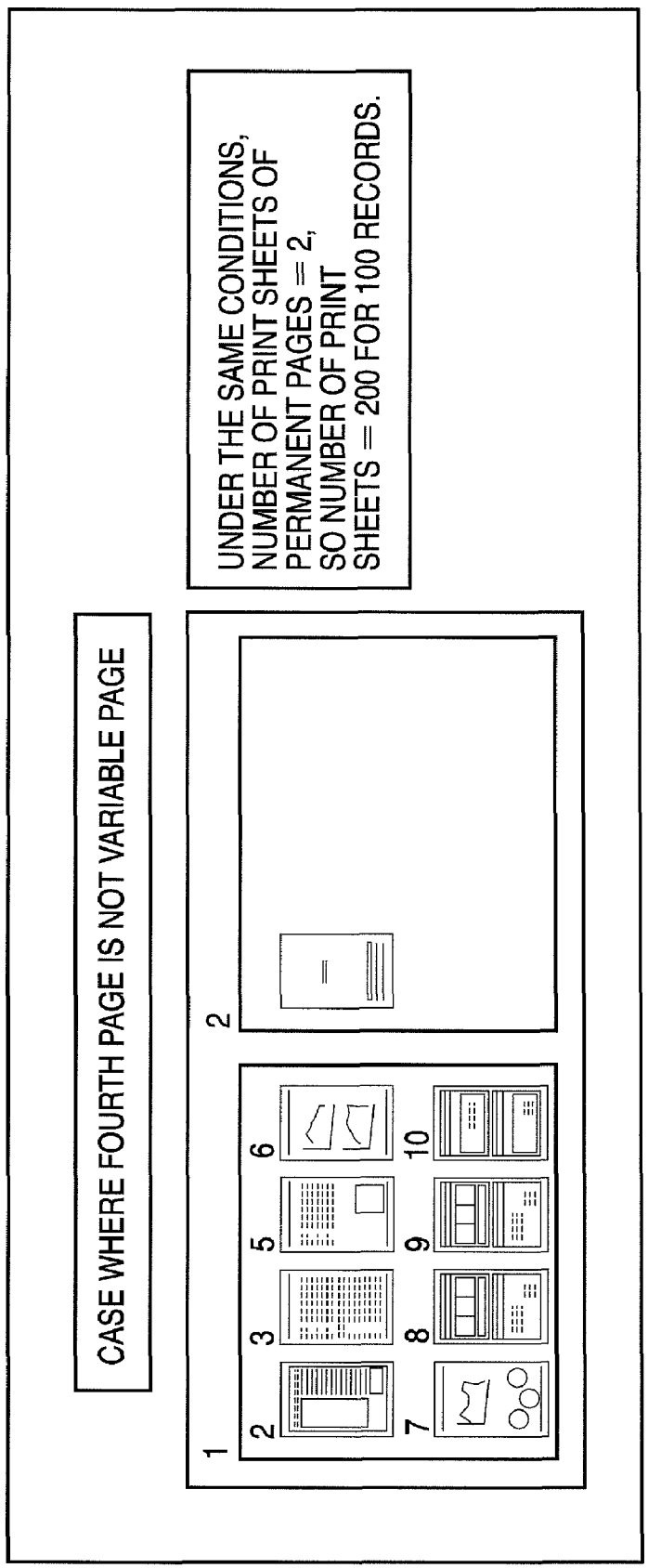
FIG. 27D is a view for explaining a concrete example of the imposition process according to the embodiment shown in FIG. 25.

The number of output sheets by page order becomes larger in, for example, the following case. Assume that the fourth page of the document data shown in FIG. 27A is not variable data, that is, the document data has nine permanent pages. In this case, page order requires two output sheets per record for the permanent pages of the document data at the same setting (imposition type "2×4"). The number of output sheets for 100 records is 200 (FIG. 27D). In contrast, page repeat requires nine output sheets per record for the permanent pages of the document data. The number of output sheets for 100 records is 13×9=117. In this case, the bookbinding application 104 determines in step S4207 that the number of output sheets by page repeat is smaller, and executes the page repeat imposition process (step S4209).

As described above, according to this embodiment, the imposition method is adaptively set by switching it between page order and page repeat based on the composition and print settings of document data to be processed. This can further suppress the sheet cost to output permanent pages.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-308408 filed on Nov. 14, 2006, which is hereby incorporated by reference herein in its entirety.

The invention claimed is:

1. An information processing apparatus comprising:
a storage unit adapted to store document data including both a permanent page whose page content is permanent and a variable page whose page content varies depending on a plurality of types of records; and
a generation unit adapted to generate, from the document data, print data which includes the variable page and is to be output to a first printing apparatus serving as a plateless printing apparatus, and plate data which does not include the variable page and is used to make a press plate used in a second printing apparatus serving as a plate printing apparatus.

2. The apparatus according to claim 1, wherein said generation unit divides the document data into first document data including the variable page and second document data including no variable page, and generates, from the first document data, print data which includes the variable page and is to be output to the first printing apparatus serving as the plateless printing apparatus, and from the second document data, plate data which does not include the variable page and is used to make a press plate used in the second printing apparatus serving as the plate printing apparatus.

3. The apparatus according to claim 1, further comprising a determination unit adapted to determine whether the number of print sheets of the permanent page in the document data is not smaller than a set threshold value, wherein when said determination unit determines that the number of print sheets is smaller than the threshold value, said generation unit generates print data to be output to the first printing apparatus from the document data including both the variable page and the permanent page.

4. The apparatus according to claim 3, further comprising a threshold value setting unit adapted to set means for setting the threshold value.

5. The apparatus according to claim 2, further comprising:
a first setting unit adapted to make a first imposition setting to impose the first document data on a print sheet;
a second setting unit adapted to make a second imposition setting to impose the second document data on a press plate;
a first imposition processing unit adapted to execute a first imposition process of the first document data in accordance with the first imposition setting; and
a second imposition processing unit adapted to execute a second imposition process of the second document data in accordance with the second imposition setting.

6. The apparatus according to claim 5, further comprising a display unit adapted to display imposition results by said first imposition processing unit and said second imposition processing unit.

7. The apparatus according to claim 5, further comprising:
an acquisition unit adapted to acquire the number of records for a variable page in the document data and the number of permanent pages in the document data;
a calculation unit adapted to calculate, on the basis of the second imposition setting, and the number of records and the number of permanent pages which are acquired by said acquisition unit, the first number of output sheets of the first document data whose imposition method is page order, and the second number of output sheets of the second document data whose imposition method is page repeat; and
an auto imposition processing unit adapted to execute an imposition process for permanent pages in the document data by either of a page order imposition process and a page repeat imposition process on the basis of a calculation result of said calculation unit.

8. A method of controlling an information processing apparatus which processes document data including both a permanent page whose page content is permanent and a variable page whose page content varies depending on a plurality of types of records, the method comprising:
at a generation unit, a generation step of generating, from the document data, print data which includes the variable page and is to be output to a first printing apparatus serving as a plateless printing apparatus, and plate data which does not include the variable page and is used to make a press plate used in a second printing apparatus serving as a plate printing apparatus; and
at an output unit, an output step of outputting the print data generated in the generation step to the first printing apparatus, and the plate data generated in the generation step to a plate making apparatus.

9. A non-transitory computer-readable medium which causes a computer to control an information processing apparatus which processes document data including both a permanent page whose page content is permanent and a variable page whose page content varies depending on a plurality of types of records, the program causing the computer to execute a generation step of generating, from the document data, print data which includes the variable page and is to be output to a first printing apparatus serving as a plateless printing apparatus, and plate data which does not include the variable page and is used to make a press plate used in a second printing apparatus serving as a plate printing apparatus, and an output step of outputting the print data generated in the generation step to the first printing apparatus, and the plate data generated in the generation step to a plate making apparatus.

* * * * *